US012084598B2

(12) United States Patent
Fujiwara

(10) Patent No.: US 12,084,598 B2
(45) Date of Patent: Sep. 10, 2024

(54) RESIN COMPOSITION, ADHESIVE MEMBER, AND DISPLAY DEVICE INCLUDING THE SAME

(71) Applicant: Samsung Display Co., Ltd., Yongin-si (KR)

(72) Inventor: Tetsuya Fujiwara, Yokohama (JP)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 130 days.

(21) Appl. No.: 17/381,107

(22) Filed: Jul. 20, 2021

(65) Prior Publication Data

US 2022/0169893 A1 Jun. 2, 2022

(30) Foreign Application Priority Data

Dec. 2, 2020 (KR) ........................ 10-2020-0166846

(51) Int. Cl.

| | |
|---|---|
| ***C09J 4/06*** | (2006.01) |
| ***B32B 7/12*** | (2006.01) |
| ***B32B 17/10*** | (2006.01) |
| ***B32B 27/06*** | (2006.01) |
| ***C09J 133/06*** | (2006.01) |
| ***G06F 3/041*** | (2006.01) |
| ***G09F 9/30*** | (2006.01) |

(52) U.S. Cl.

CPC ................... *C09J 4/06* (2013.01); *B32B 7/12* (2013.01); *B32B 17/10* (2013.01); *B32B 27/06* (2013.01); *C09J 133/066* (2013.01); *G06F 3/0412* (2013.01); *G09F 9/301* (2013.01); *B32B 2457/20* (2013.01)

(58) Field of Classification Search

CPC .......... B32B 7/12; B32B 2457/20; C09J 4/06; C08F 226/06; C08F 290/067

See application file for complete search history.

(56) References Cited

U.S. PATENT DOCUMENTS

| | | | |
|---|---|---|---|
| 10,174,224 | B2 | 1/2019 | Yoon et al. |
| 2018/0362279 | A1 | 12/2018 | Yoshida et al. |
| 2020/0199352 | A1 | 6/2020 | Masuda et al. |

FOREIGN PATENT DOCUMENTS

| | | | | |
|---|---|---|---|---|
| JP | 2014028976 A | * 2/2014 | .............. C08F 20/28 |
| JP | 2015531804 A | 11/2015 | |

(Continued)

OTHER PUBLICATIONS

Machine translation of JP2017178992A, published Oct. 2017, Powered by EPO and Google. (Year: 2017).*

(Continued)

*Primary Examiner* — Monique R Jackson

(74) *Attorney, Agent, or Firm* — CANTOR COLBURN LLP

(57) ABSTRACT

A resin composition including at least one of a monofunctional (meth)acrylate having an imide ring structure or a monomer having a 2-pyrrolidone skeleton and a radical curable group in an amount of about 0.1 weight percent to about 5 weight percent based on the total weight of the resin composition, wherein the resin composition has a viscosity of about 5 millipascal seconds to less than about 50 millipascal seconds at 25° C., and wherein a glass transition temperature of the resin composition after being cured satisfies a value of about −50° C. to less than about 0° C.

20 Claims, 10 Drawing Sheets

(56) References Cited

FOREIGN PATENT DOCUMENTS

| | | | | | |
|---|---|---|---|---|---|
| JP | 5826639 | B2 | | 12/2015 | |
| JP | 5948075 | B2 | | 7/2016 | |
| JP | 2017066322 | A | * | 4/2017 | .............. B32B 7/12 |
| JP | 2017095659 | A | | 6/2017 | |
| JP | 2017178992 | A | * | 10/2017 | |
| JP | 2017210578 | A | | 11/2017 | |
| JP | 2018045213 | A | | 3/2018 | |
| JP | 2019061323 | A | | 4/2019 | |
| JP | 6523098 | B2 | | 5/2019 | |
| JP | 2019089975 | A | | 6/2019 | |
| JP | 2019099714 | A | | 6/2019 | |
| JP | 6572417 | B2 | | 9/2019 | |
| JP | 2019218531 | A | | 12/2019 | |
| JP | 2020007552 | A | | 1/2020 | |
| KR | 20180100244 | A | | 9/2018 | |
| WO | 2014027788 | A1 | | 2/2014 | |
| WO | 2017203783 | A1 | | 11/2017 | |

OTHER PUBLICATIONS

Machine translation of JP2017066322A, published Apr. 2017, Powered by EPO and Google. (Year: 2017).*

Machine translation of JP2014028976A, published Feb. 2014, Powered by EPO and Google. (Year: 2014).*

* cited by examiner

RESIN COMPOSITION, ADHESIVE MEMBER, AND DISPLAY DEVICE INCLUDING THE SAME

CROSS-REFERENCE TO RELATED APPLICATIONS

This U.S. non-provisional patent application claims priority to Korean Patent Application No. 10-2020-0166846, and all the benefits accruing therefrom under 35 U.S.C. § 119, filed on Dec. 2, 2020, the entire contents of which are hereby incorporated by reference.

BACKGROUND

The present disclosure herein relates to a resin composition, an adhesive member formed of the resin composition, and a display device including the adhesive member.

Various display devices used for multimedia devices, such as a television, a mobile phone, a tablet computer, a navigation system, a game machine, and the like are being developed. Recently, in order to facilitate portability and improve user convenience, display devices that are foldable, bendable, or rollable are being developed, that include bendable, flexible display members.

Each of the members used in such a flexible display device is required to be reliable in a folding or bending operation. In addition, an adhesive resin used for forming an adhesive layer applied to display devices of various forms is required to have excellent or improved coating properties, for ease of application to members of various types of display devices.

SUMMARY

The present disclosure provides a resin composition having excellent or improved coating properties.

The present disclosure also provides an adhesive member having high or improved adhesive strength and excellent or improved bending resistance by curing the resin composition.

The present disclosure also provides a display device including the adhesive member, thereby having excellent or improved reliability in an operation such as folding.

An embodiment of the inventive concept provides a resin composition including:

at least one of a monofunctional (meth)acrylate having an imide ring structure or a monomer having a 2-pyrrolidone skeleton and a radical curable group in an amount of about 0.1 weight percent (wt %) to about 5 wt % based on the total weight of the resin composition, wherein the resin composition has a viscosity of about 5 millipascal seconds (mPa·s) to less than about 50 millipascal seconds at 25° C., and wherein a glass transition temperature of the resin composition after being cured is about −50° C. to less than 0° C.

In an embodiment, a 180° peel strength of the resin composition after being cured on glass or a polyimide film may be about 1000 gram-force per 25 millimeter (gf/25 mm) or greater.

In an embodiment, the resin composition may further include a urethane (meth)acrylate oligomer, and the urethane (meth)acrylate oligomer may be present in an amount of about 2 wt % to about 15 wt % based on the total weight of the resin composition.

In an embodiment, the monofunctional (meth)acrylate of the resin composition may further include at least one (meth)acrylate monomer having a weight average molecular weight of about 1 to about 500 grams per mole, and at least one (meth)acrylate oligomer having a weight average molecular weight of about 6000 grams per mole or greater.

In an embodiment, the resin composition may further include an organic solvent, wherein the organic solvent may be present in an amount of about 1 wt % or less based on the total weight of the resin composition.

In an embodiment, the resin composition may further include a radical polymerization initiator.

In an embodiment, the resin composition may further include a photoinitiator.

In an embodiment of the inventive concept, an adhesive member may include a polymer derived from a resin composition, the resin composition including at least one of a monofunctional (meth)acrylate having an imide ring structure or a monomer having a 2-pyrrolidone skeleton and a radical curable group in an amount of about 0.1 weight percent to about 5 weight percent based on the total weight of the resin composition, wherein the resin composition has a viscosity of about 5 millipascal seconds (mPa·s) to less than about 50 millipascal seconds at 25° C., and wherein a glass transition temperature of the resin composition after being cured is about −50° C. to less than about 0° C.

In an embodiment, the polymer may be obtained by photo-curing the resin composition.

In an embodiment, the resin composition after being cured may have a 180° peel strength of about 1000 gf/25 mm for glass or a polyimide film.

In an embodiment, the resin composition may further include a urethane (meth)acrylate oligomer, wherein the urethane (meth)acrylate oligomer may be present in an amount of about 2 wt % to about 15 wt % based on the total weight of the resin composition.

In an embodiment, the resin composition may further include an organic solvent, wherein the organic solvent may be present in an amount of about 1 wt % or less based on the total weight of the resin composition.

In an embodiment, the resin composition may further include a photoinitiator.

In an embodiment of the inventive concept, a display device may include a display panel, a window disposed on the display panel, and an adhesive member disposed between the display panel and the window, wherein the adhesive member is derived from a resin composition, wherein the resin composition may include at least one of a monofunctional (meth)acrylate having an imide ring structure or a monomer having a 2-pyrrolidone skeleton and a radical curable group in an amount of 0.1 wt % to 5 wt % based on the total weight of the resin composition, wherein the resin composition has a viscosity of about 5 millipascal seconds to less than about 50 millipascal seconds at 25° C., and wherein the glass transition temperature of the resin composition after being cured is about −50° C. to less than about 0° C.

In an embodiment, the thickness of the adhesive member may be about 50 micrometer (μm) to about 200 μm.

In an embodiment, the display device may further include an input sensing unit, wherein the adhesive member may be disposed between the display panel and the input sensing unit or between the input sensing unit and the window.

In an embodiment, the display panel may include a display element layer and an encapsulation layer disposed on the display element layer, wherein the input sensing unit may be directly disposed on the encapsulation layer, and the adhesive member may be disposed on the input sensing unit.

In an embodiment, the adhesive member may be formed by directly providing the resin composition on a surface of the window or on a surface of the display panel, and UV-curing the provided resin composition.

In an embodiment, the display device may include at least one folding region, and the folding region may have a radius of curvature of about 5 millimeter (mm) or less.

In an embodiment, the display device may further include a light control layer disposed between the adhesive member and the window, and an optical adhesive layer disposed between the light control layer and the window, wherein the optical adhesive layer may include a polymer derived from the resin composition.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
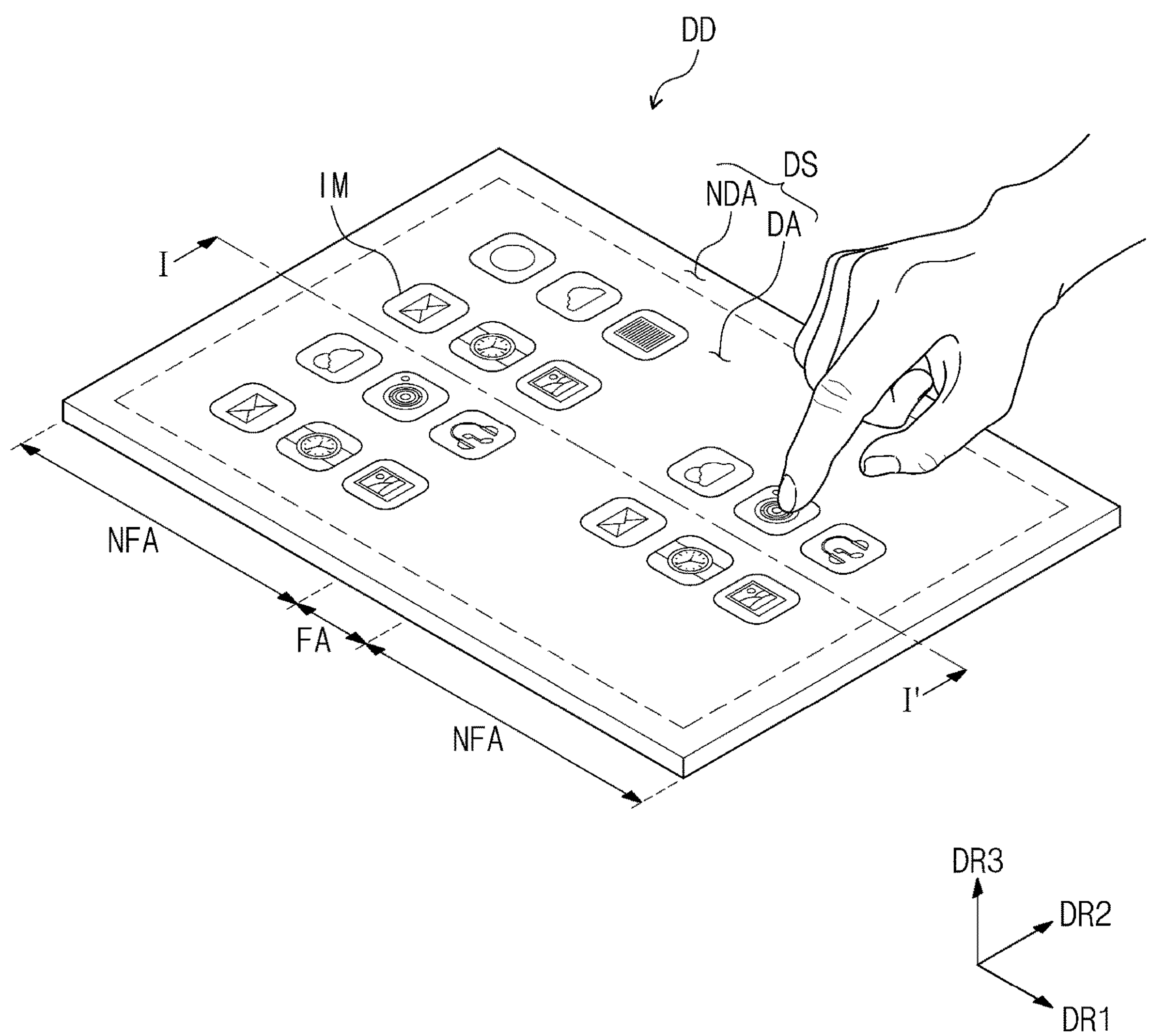
FIG. 1 is a perspective view of a display device according to an embodiment of the inventive concept.

The inventive concept may be modified in many alternative forms, and thus specific embodiments will be exemplified in the drawings and described in detail. It should be understood, however, that it is not intended to limit the inventive concept to the particular forms disclosed, but rather, is intended to cover all modifications, equivalents, and alternatives falling within the spirit and scope of the invention.

In the present disclosure, when an element (or a region, a layer, a portion, etc.) is referred to as being "on," "connected to," or "coupled to" another element, it means that the element may be directly disposed on/connected to/coupled to the other element, or that a third element may be disposed therebetween.

As used in the present disclosure, being "directly disposed" means that there is no layer, film, region, plate, or the like added between a portion of a layer, a film, a region, a plate, or the like and other portions. For example, being "directly disposed" may mean being disposed without additional members such as an adhesive member between two layers or two members.

Like reference numerals refer to like elements. Also, in the drawings, the thickness, the ratio, and the dimensions of elements are exaggerated for an effective description of technical contents.

The term "and/or", includes all combinations of one or more of which associated configurations may define. As used herein, unless otherwise indicated or explicitly contradicted by context, it should be interpreted as including both singular and plural. Also as used herein, the singular forms "a", "an", and "the" are intended to include the plural as well, unless the context clearly indicates otherwise.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concept. The terms of a singular form may include plural forms unless the context clearly indicates otherwise.

In addition, terms such as "below", "lower", "above", "upper", and the like are used to describe the relationship of the configurations shown in the drawings. The terms are used as a relative concept and are described with reference to the direction indicated in the drawings. In the present disclosure, being "disposed on" may not only include the case of being disposed on an upper portion of any one member but also the case of being disposed on a lower portion thereof.

Unless otherwise defined, all terms (including technical and scientific terms) used herein have the same meaning as commonly understood by those skilled in the art to which the inventive concept pertains. It is also to be understood that terms defined in commonly used dictionaries should be interpreted as having meanings consistent with the meanings in the context of the related art, and are interpreted as being expressly defined herein unless they are interpreted in an ideal or overly formal sense.

It should be understood that the terms "comprise", "comprising", "includes", "including", "have", or "having" are intended to specify the presence of stated features, integers, steps, operations, elements, components, or combinations thereof in the disclosure, but do not preclude the presence or addition of one or more other features, integers, steps, operations, elements, components, or combinations thereof.

Expressions such as "at least one", "at least one kind", "one or more kinds", or "one or more" when preceding a list of elements, modify the entire list of elements and do not modify the individual elements of the list. As used herein, the term "combination thereof" is used to refer to a mixture or alloy of two or more components described above.

Throughout the present specification, "an embodiment", "example embodiment", "exemplary embodiment", etc. are included in at least one embodiment in which specific elements described in connection with the embodiment are included in this specification, which means that these elements may or may not exist in another embodiment. Further, it should be understood that the described elements may be combined in any suitable manner in various embodiments.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +20%, 10%, 5% of the stated value.

Hereinafter, a resin composition, an adhesive member, and a display device according to an embodiment of the inventive concept will be described with reference to the accompanying drawings.

Figure 2:
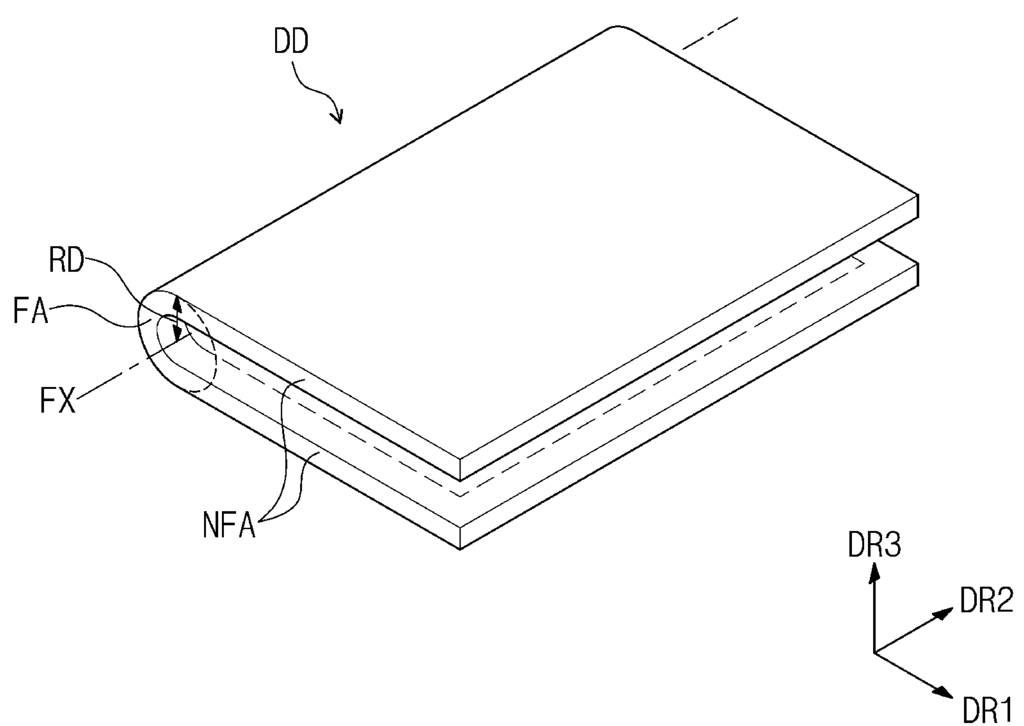
FIG. 2 is a view illustrating the display device illustrated in FIG. 1 in a folded state.

FIG. 1 is a perspective view of a display device according to an embodiment of the inventive concept. FIG. 2 is a view illustrating the display device in FIG. 1 in a folded state.

Referring to FIG. 1, a display device DD of an embodiment may have a rectangular shape which has long sides extending in a first direction DR1 and short sides extending in a second direction DR2 which intersects the first direction DR1. However, an embodiment of the inventive concept is not limited thereto. The display device DD may have various shapes such as circular and polygonal shapes on a plane. The display device DD may be a flexible display device.

In the display device DD according to an embodiment, a display surface DS on which an image IM is displayed may be parallel to a plane defined by the first direction DR1 and the second direction DR2. The normal direction of the display surface DS, that is, the thickness direction of the display device DD is indicated by a third direction DR3. A front surface (or an upper surface) and a back surface (or a lower surface) of each member are distinguished by the third direction DR3. However, directions indicated by the first to third directions DR1, DR2, and DR3 are a relative concept, and may be converted to different directions. Hereinafter, first to third directions are directions indicated by the first to third directions DR1, DR2, and DR3, respectively, and are given the same reference numerals.

The display device DD of an embodiment may include at least one folding region FA. Referring to FIG. 1 and FIG. 2, the display device DD may include the folding region FA and a plurality of non-folding regions NFA. The folding region FA is disposed between the non-folding regions NFA, and the folding region FA and the non-folding region NFA may be arranged adjacent to each other in the direction of the first direction DR1.

The folding region FA may be a portion deformable into a folded shape based on a folding axis FX extending in the direction of the second direction DR2. The folding region FA may have a radius of curvature RD of about 5 mm or less, for example, about 4 mm or less, about 3 mm or less, about 2 mm or less, or about 1 mm or less. The folding region FA may have a radius of curvature RD of about 0.01 mm to about 5 mm, about 0.01 mm to about 4 mm, about 0.01 mm to about 3 mm, about 0.01 mm to about 2 mm, about 0.01 mm to about 1 mm, or about 0.01 mm to about 0.5 mm.

FIG. 1 and FIG. 2 exemplarily show one folding region FA and two non-folding regions NFA. However, the number of the folding region FA and the non-folding regions NFA are not limited thereto. For example, the display device DD may include a plurality of non-folding regions NFA which is more than two and a plurality of folding regions FA disposed between the non-folding regions NFA.

In the display device DD of an embodiment, the non-folding regions NFA may be disposed to be symmetrical to each other with respect to the folding region FA. However, the embodiment of the inventive concept is not limited thereto. The folding region FA is disposed between the non-folding regions NFA, but the areas of two non-folding regions NFA facing each other with respect to the folding region FA may be different.

The display surface DS of the display device DD may include a display region DA and a non-display region NDA around the display region DA. The display region DA displays an image IM and the non-display region NDA may not display an image. The non-display region NDA surrounds the display region DA, and may define the edge of the display device DD.

Referring to FIG. 2, the display device DD may be a foldable display device DD which is folded or unfolded. For example, the folding region FA may be bent based on the folding axis FX, which is parallel to the second direction DR2, so that the display device DD may be folded. The folding axis FX may be defined as a short axis which is parallel to a short side of the display device DD.

When the display device DD is folded, the non-folding regions NFA face each other, and the display device DD may be in-folded such that the display surface DS is not exposed to the outside. However, the embodiment of the inventive concept is not limited thereto. Unlike what is illustrated in the drawing, the display device DD may be out-folded such that the display surface DS is exposed to the outside.

Figure 3:
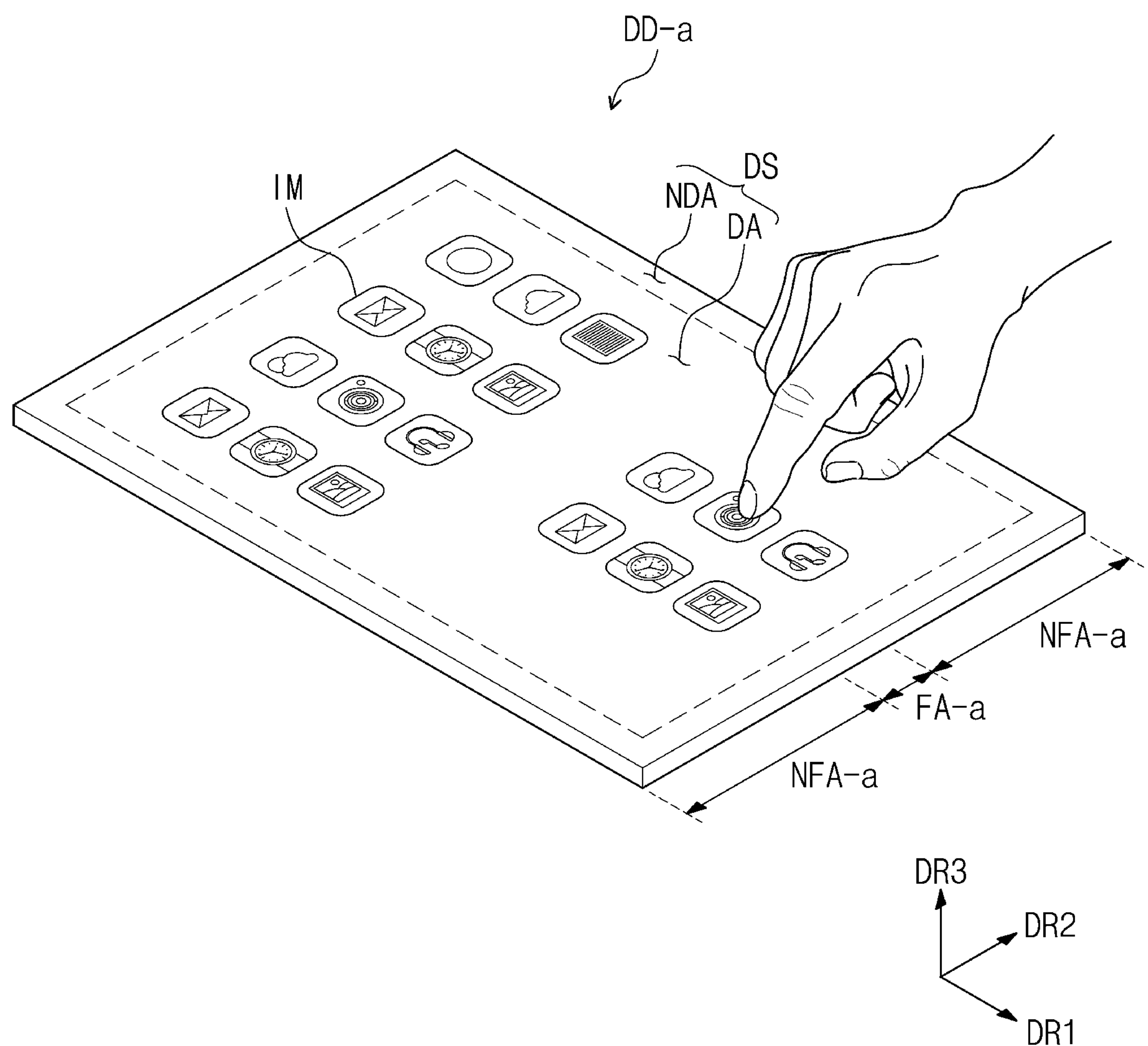
FIG. 3 is a perspective view of a display device according to an embodiment of the inventive concept.
Figure 4:
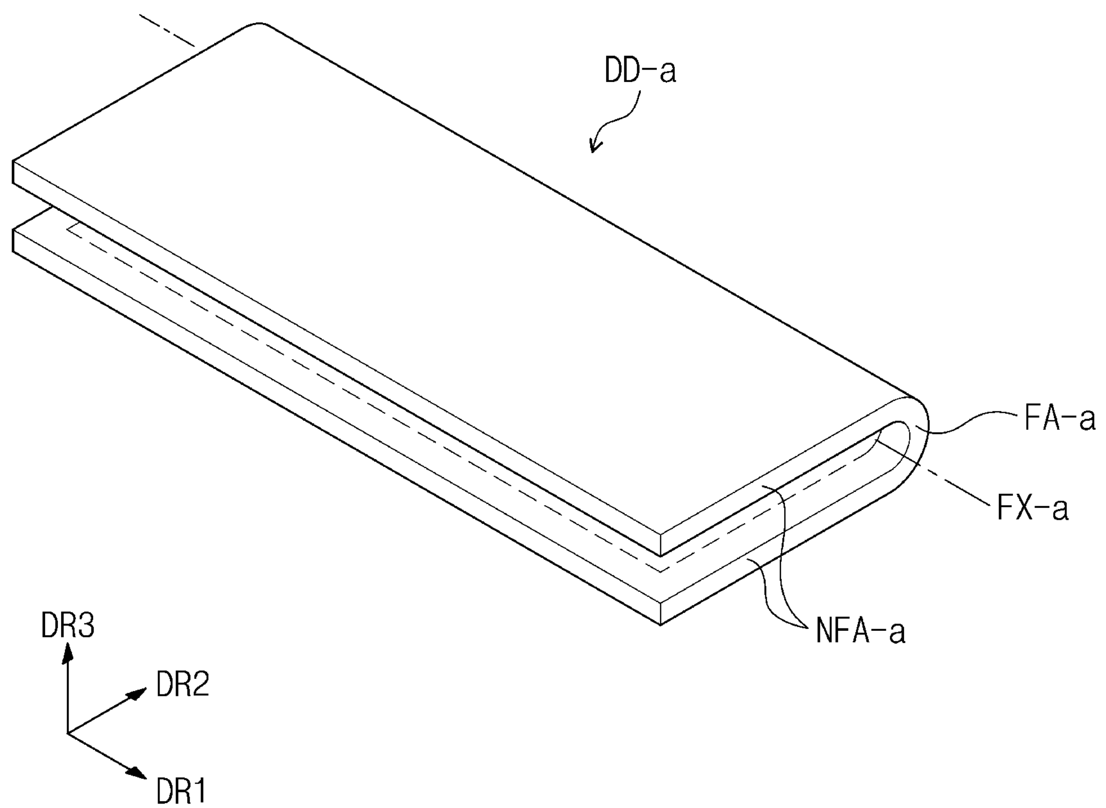
FIG. 4 is a view illustrating the display device illustrated in FIG. 3 in a folded state.

FIG. 3 is a perspective view of a display device according to an embodiment of the inventive concept. FIG. 4 is a view illustrating the display device illustrated in FIG. 3 in a folded state.

Except for a folding operation, a display device DD-a illustrated in FIG. 3 may have substantially the same configuration as that of the display device DD illustrated in FIG. 1. Therefore, hereinafter, in the description of the display device DD-a illustrated in FIG. 3 and FIG. 4, the folding operation will be mainly described.

Referring to FIG. 3 and FIG. 4, the display device DD-a may include a folding region FA-a and a plurality of non-folding regions NFA-a. The folding region FA-a is disposed between the non-folding regions NFA-a, and the folding region FA-a and the non-folding regions NFA-a may be arranged adjacent to each other in the second direction DR2.

The folding region FA-a may be bent based on a folding axis FX-a which is parallel to the first direction axis DR1, so that the display device DD-a may be folded. The folding axis FX-a may be defined as a long axis which is parallel to a long side of the display device DD-a. The display device DD illustrated in FIG. 1 may be folded based on a short axis, whereas the display device DD-a illustrated in FIG. 3 may be folded based on a long axis. In FIG. 4, the display device DD-a is illustrated as being in-folded such that a display surface DS is not exposed to the outside. However, the embodiment of the inventive concept is not limited thereto. The display device DD-a is folded based on the long axis, and may be out-folded such that the display surface DS is exposed to the outside or exterior or the device.

Figure 5:
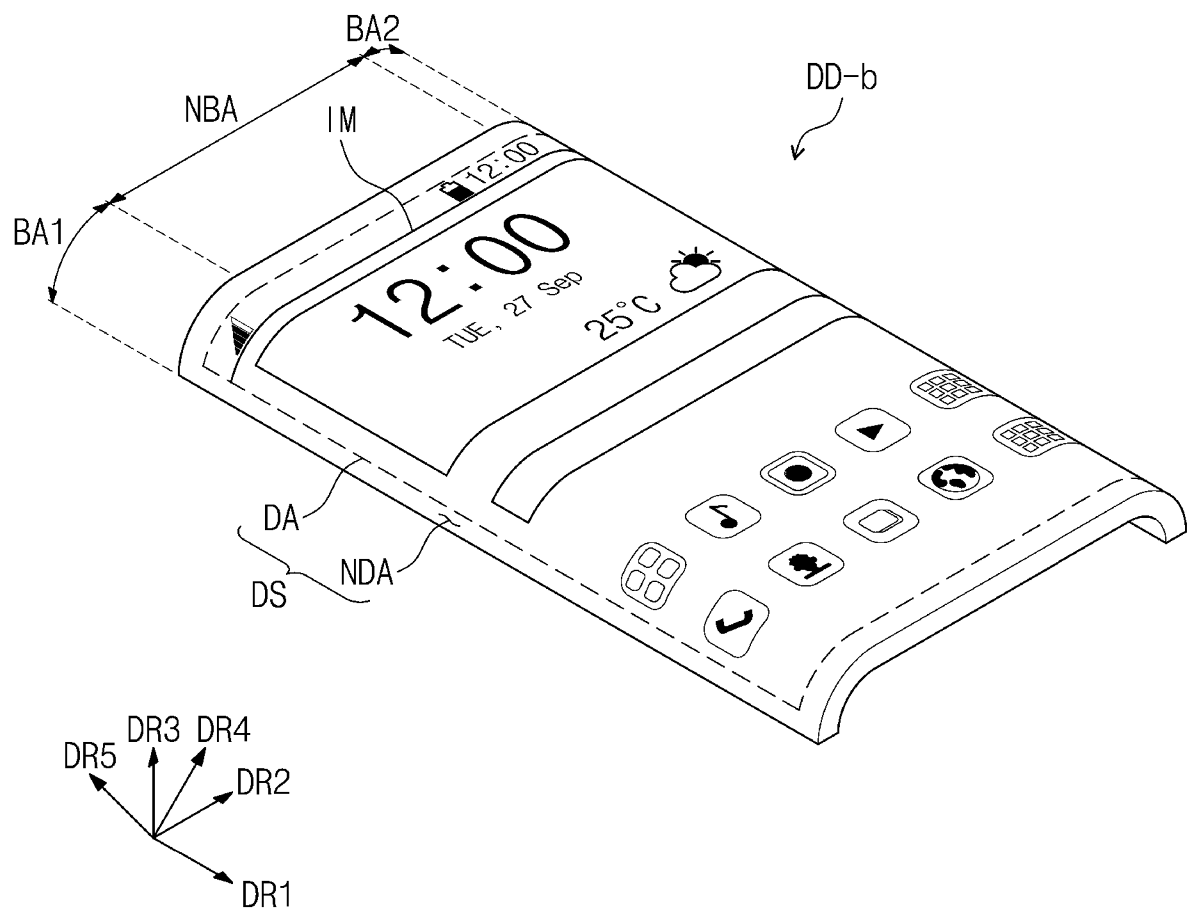
FIG. 5 is a perspective view of a display device according to an embodiment of the inventive concept.

FIG. 5 is a perspective view of a display device according to an embodiment of the inventive concept. A display device DD-b of an embodiment includes bending regions BA1, and BA2 and a non-bending region NBA, and the bending regions BA1 and BA2 may be bent from one side of the non-bending region NBA.

Referring to FIG. 5, the display device DD-b of an embodiment may include the non-bending region NBA in which the image IM is displayed on the front surface thereof, and a first bending region BA1 and a second bending region BA2 in which the image IM is displayed on side surfaces thereof. The first bending region BA1 and the second bending region BA2 may be bent from both sides of the non-bending region NBA, respectively.

Referring to FIG. 5, the non-bending region NBA may provide the image IM in the third direction DR3, which is the front surface of the display device DD-b, and the first bending region BA1 and the second bending region BA2 may provide an image in a fifth direction DR5 and in a fourth direction DR4, respectively. The fourth direction DR4 and the fifth direction DR5 may be directions intersecting the first to third directions DR1, DR2, and DR3. However, directions indicated by the first to fifth directions DR1 to DR5 are a relative concept, and are not limited to directional relationship illustrated in the drawings.

The display device DD-b of an embodiment may be a bending display device including the non-bending region NBA and the bending regions BA1 and BA2 respectively disposed on both sides of the non-bending region NBA. Although not illustrated, a display device of an embodiment may be a bending display device including one non-bending region and one bending region. At this time, the bending region may be provided by being bent on only one side of the non-bending region.

In FIG. 1 to FIG. 5 described above, a foldable display device, a bending display device, and the like are illustrated and described. However, the embodiment of the inventive concept is not limited thereto. A display device of an embodiment may be a rollable display device, a flat rigid display device, or a bent rigid display device.

Hereinafter, in the description of a display device of an embodiment, the display device DD which is folded based on a short axis will be representatively described, but the embodiment of the inventive concept is not limited thereto. The following descriptions may be applied to various display devices other than the display device DD-a which is folded based on a long axis and the display device DD-b including a bending region.

Figure 6:
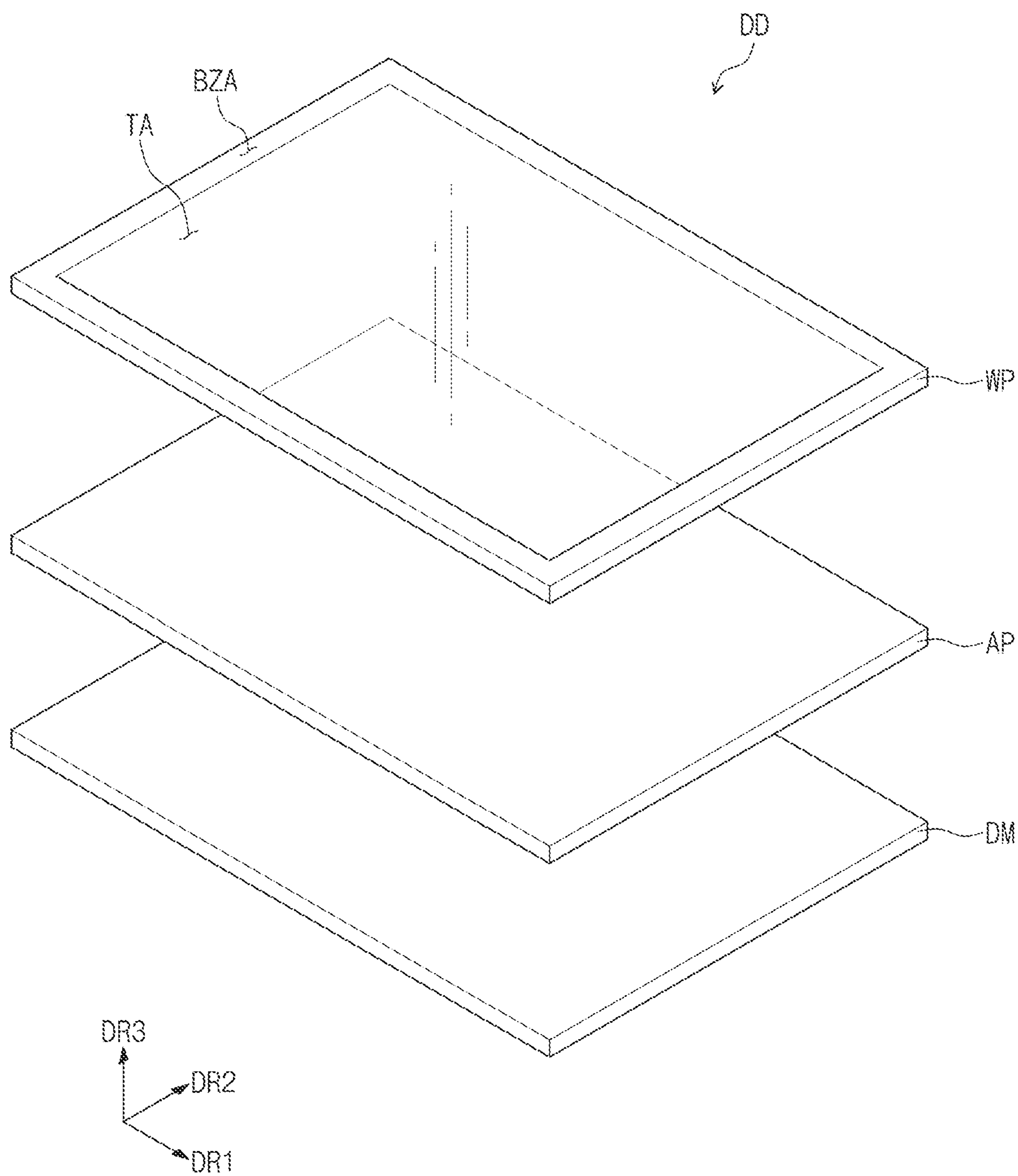
FIG. 6 is an exploded perspective view of a display device according to an embodiment of the inventive concept.
Figure 7:
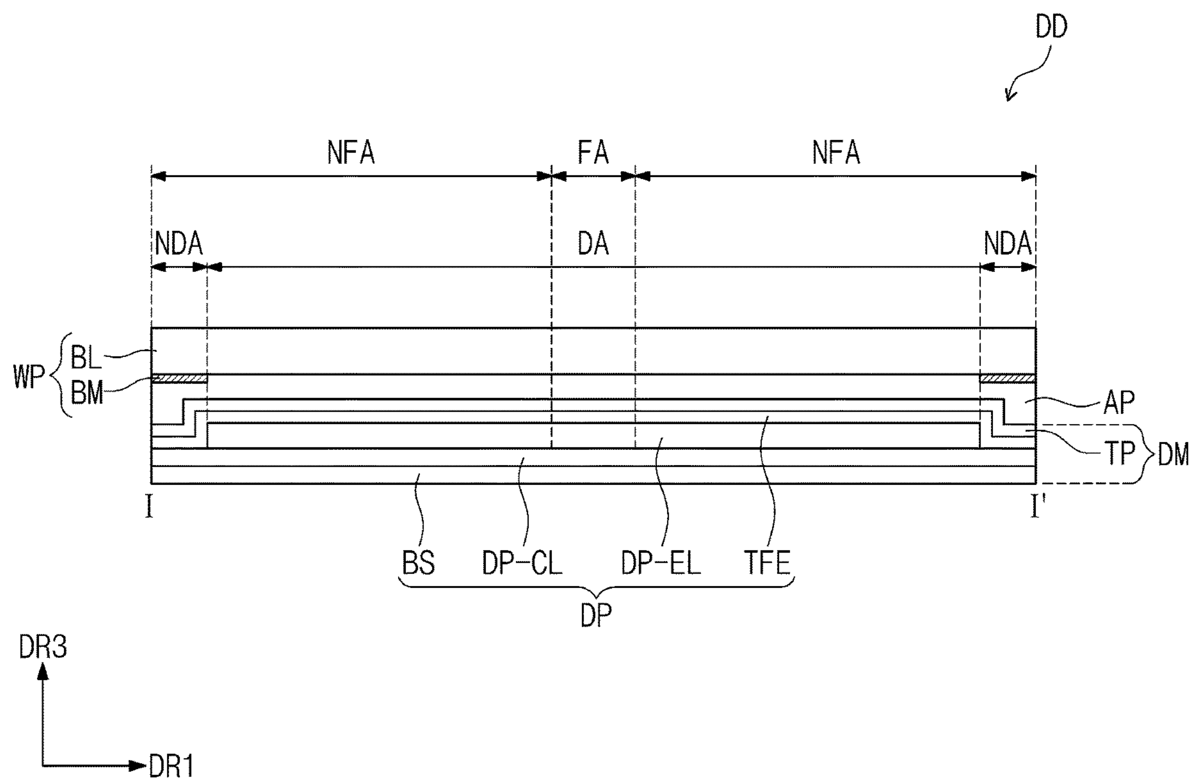
FIG. 7 is a cross-sectional view of a display device according to an embodiment of the inventive concept.

FIG. 6 is an exploded perspective view of the display device DD of an embodiment. FIG. 7 is a cross-sectional view of the display device DD of an embodiment. FIG. 7 may be a cross-sectional view corresponding to line I-I' of FIG. 1.

The display device DD of an embodiment may include a display module DM and a window WP disposed on the display module DM. In the display device DD of an embodiment, the display module DM may include a display panel DP including a display element layer DP-EL and an input sensing unit TP disposed on the display panel DP. The display device DD of an embodiment may include an adhesive member AP disposed between the display panel DP and the window WP. For example, in the display device DD of an embodiment, the adhesive member AP may be disposed between the input sensing unit TP and the window WP. The adhesive member AP may be an optically clear adhesive (OCA) film or an optically clear resin (OCR) layer.

The adhesive member AP may be formed from a resin composition of an embodiment. The adhesive member AP may include a polymer derived from the resin composition of an embodiment.

The resin composition of an embodiment includes at least one of a monofunctional (meth)acrylate having a ring-shaped imide structure, i.e., an imide ring structure or a monomer having a 2-pyrrolidone skeleton and a radical curable group in an amount of about 0.1 wt % to about 5 wt %. In the present specification, a monofunctional (meth) acrylate having a ring-shaped imide structure or an imide ring structure means a monofunctional (meth)acrylate including a ring-shaped imide structure, i.e., an imide ring structure in the molecular structure thereof.

For example, the resin composition of an embodiment may include a monofunctional (meth)acrylate having an imide ring structure in an amount of about 0.1 wt % to about 5 wt % based on the total weight of the resin composition. For example, the resin composition of an embodiment may include a monofunctional (meth)acrylate having an imide ring structure in an amount about 0.1 wt % to about 4.5 wt %, about 0.1 wt % to about 4 wt %, about 0.1 wt % to about 3.5 wt %, about 0.1 wt % to about 3 wt %, about 0.1 wt % to about 2.5 wt %, about 0.1 wt % to about 2 wt %, about 0.1 wt % to about 1 wt %, or about 0.1 wt % to about 0.5 wt % based on the total weight of the resin composition. Alternatively, the resin composition of an embodiment may include a monomer having a 2-pyrrolidone skeleton and a radical curable group in an amount of about 0.1 wt % to about 5 wt % based on the total weight of the resin composition. For example, the resin composition of an embodiment may include a monomer having a 2-pyrrolidone skeleton and a radical curable group in an amount of about 0.1 wt % to about 4.5 wt %, about 0.1 wt % to about 4 wt %, about 0.1 wt % to about 3.5 wt %, about 0.1 wt % to about 3 wt %, about 0.1 wt % to about 2.5 wt %, about 0.1 wt % to about 2 wt %, about 0.1 wt % to about 1 wt %, or about 0.1 wt % to about 0.5 wt % based on the total weight of the resin composition. Alternatively, the resin composition of an embodiment may include both a monofunctional (meth)acrylate having an imide ring structure, and a monomer having a 2-pyrrolidone skeleton and a radical curable group, wherein the sum of the weights of the monofunctional (meth)acrylate having an imide ring structure and the monomer having a 2-pyrrolidone skeleton and a radical curable group is 0.1 wt % to 5 wt % based on the total weight of the resin composition. For example, the resin composition of an embodiment may include both a monofunctional (meth)acrylate having an imide ring structure, and a monomer having a 2-pyrrolidone skeleton and a radical curable group, wherein the sum of the weights of the monofunctional (meth)acrylate having an imide ring structure and the monomer having a 2-pyrrolidone skeleton and a radical curable group is about 0.1 wt % to about 4.5 wt %, about 0.1 wt % to about 4 wt %, about 0.1 wt % to about 3.5 wt %, about 0.1 wt % to about 3 wt %, about 0.1 wt % to about 2.5 wt %, about 0.1 wt % to about 2 wt %, about 0.1 wt % to about 1 wt %, or about 0.1 wt % to about 0.5 wt % based on the total weight of the resin composition.

In the present specification, (meth)acrylate means acrylate or methacrylate.

For example, the resin composition of an embodiment may include at least one of N-acryloyloxyethylhexahydrophthalimide (ARONIX M-140) or N-acryloyloxysuccinimide (N-succinimidyl acrylate) is a monofunctional (meth) acrylate having an imide ring structure.

The resin composition of an embodiment may include at least one of 2-pyrrolidone-N-ethyl acrylate or 2-pyrrolidone-N-propyl acrylate as a monomer having a 2-pyrrolidone skeleton and a radical curable group.

The resin composition of an embodiment may include at least one of a monofunctional (meth)acrylate having an imide ring structure or a monomer having a 2-pyrrolidone skeleton and a radical curable group in an amount of about 0.1 wt % to about 5 wt %, and thus, may have excellent or improved adhesion force. For example, the resin composition of an embodiment may include the above composition, and thus, may have high or improved adhesion force for glass or a polyimide film.

The resin composition of an embodiment has a viscosity of about 5 mPa·s to less than about 50 mPa·s at 25° C. as measured according to JIS K2283. For example, the resin composition of an embodiment has a viscosity of about 5 mPa·s to about 45 mPa·s, about 5 mPa·s to about 40 mPa·s, about 5 mPa·s to about 35 mPa·s, about 5 mPa·s to about 30 mPa·s, about 5 mPa·s to about 25 mPa·s, about 5 mPa·s to about 20 mPa·s, about 5 mPa·s to about 15 mPa·s, or about 5 mPa·s to about 10 mPa·s as measured according to JIS K2283. The viscosity of the resin composition was measured according to JIS K2283.

When the viscosity of the resin composition of an embodiment is less than about 5 mPa·s, the viscosity is too low, thereby causing a resin composition that is too liquid for the formation of an adhesive member, and accordingly, as it may be difficult to form a coating layer having a uniform thickness using the resin composition. In addition, when the viscosity of the resin composition of an embodiment is about 50 mPa·s or greater, it may be difficult for the resin composition to be discharged in an appropriate amount from a coating device used to coat the resin composition.

The resin composition of an embodiment may be photocured. For example, the resin composition may be cured by irradiating ultraviolet (UV) light.

After being cured, the resin composition has a glass transition temperature (Tg) of about −50° ° C. to less than about 0° C. For example, after being cured, the resin composition has a glass transition temperature of about −50° C. to about −1°C, about −50° C. to about −5° C., about −50° C. to about −10° C., about −50° C. to about −15° C., about −50° C. to about −20° C., about −50° C. to about −25° C., about −50° C. to about −30° C., about −50° C. to about −35° C., about −50° C. to about −45° C., or about −50° C. to about −45° C. When the Tg of the resin composition is in the above-mentioned range, the resin composition may have improved or high flexibility and bendability in low and high temperature environments.

The resin composition of an embodiment may further include a urethane (meth)acrylate oligomer as an additional component. The resin composition of an embodiment may include a urethane (meth)acrylate oligomer having a weight average molecular weight (Mw) of about 6,000 grams per mole (g/mol) or greater. For example, a urethane (meth) acrylate oligomer may have a weight average molecular weight (Mw) of about 6,000 g/mol to about 80,000 g/mol, about 6,000 g/mol to about 70,000 g/mol, about 6,000 g/mol to about 60,000 g/mol, about 6,000 g/mol to about 50,000 g/mol, about 6,000 g/mol to about 40,000 g/mol, about 6,000 g/mol to about 30,000 g/mol, about 6,000 g/mol to about 20,000 g/mol, about 6,000 g/mol to about 10,000 g/mol or about 20,000 g/mol to about 40,000 g/mol. In the resin composition of an embodiment, the weight average molecular weight of a urethane (meth)acrylate oligomer may be 27,000 g/mol to 50,000 g/mol.

In an embodiment, a urethane (meth)acrylate oligomer may include a photocurable compound containing at least one (meth)acryloyl group having a urethane group. A urethane (meth)acrylate oligomer may include at least one of acrylate having a urethane group, such as a urethane acrylate having a polycarbonate skeleton, or a urethane acrylate having a polyether skeleton. For example, the resin composition of an embodiment may include at least one of UF-C051 from KYOEISHA CHEMICAL Co., LTD, UN-7700 from Negami Chemical Industrial Co., Ltd, or UA10000B from KSM as a urethane (meth)acrylate oligomer.

In an embodiment, a resin composition containing a urethane (meth)acrylate oligomer having a weight average molecular weight of 6,000 g/mol or greater may exhibit low-viscosity properties which may allow the composition to be coated by a method such as an ink-jet printing method or a dispensing coating method. In an embodiment, a urethane (meth)acrylate oligomer having a weight average molecular weight of about 6,000 g/mol or greater is included in a resin composition while being in the state of an oligomer having a relatively high degree of polymerization and maintains the high degree of polymerization even after photocuring, and thus, may exhibit high peel force properties.

The resin composition of an embodiment may include a urethane (meth)acrylate oligomer in an amount of about 2 wt % to about 15 wt % based on the total weight of the resin composition. For example, the resin composition of an embodiment may include a urethane (meth)acrylate oligomer in an amount of about 2 wt % to about 13 wt %, about 2 wt % to about 11 wt %, about 2 wt % to about 9 wt %, about 2 wt % to about 7 wt %, about 2 wt % to about 5 wt %, or about 10 wt % to about 15 wt % based on the total weight of the resin composition. The resin composition of an embodiment includes a urethane (meth)acrylate oligomer having a weight average molecular weight of about 6,000 g/mol or greater in an amount of about 2 wt % to about 15 wt %, exhibiting a viscosity of about 5 mPa·s to less than about 50 mPa·s when in the state of a composition, and satisfying a glass transition temperature (Tg) of about −50° C. to less than about 0° C. when in the state of a cured product, may exhibit high or improved flexibility in both low and high temperature environments. In an embodiment, when an adhesive member formed of the resin composition of an embodiment is applied to a foldable display device, the folding properties of the display device may improve.

The resin composition of an embodiment may include at least one (meth)acrylate monomer having a molecular weight of about 1 g/mol to about 500 g/mol. For example, the at least one (meth)acrylate monomer may have a molecular weight of about 100 g/mol to about 450 g/mol, about 100 g/mol to about 400 g/mol, about 100 g/mol to about 350 g/mol, about 100 g/mol to about 300 g/mol, about 100 g/mol to about 250 g/mol, about 100 g/mol to about 200 g/mol, or about 100 g/mol to about 150 g/mol. For example, at least one of isodecyl acrylate (IDAA), 2-methyl-2-ethyl-1,3dioxolan-4-ylmethylacrylate (Medol-10), or 4-hydroxy butyl acrylate (4-HBA) may be included.

The resin composition of an embodiment may include at least one (meth)acrylate oligomer having a weight average molecular weight of about 6000 g/mol or greater. For example, at least one (meth)acrylate oligomer may have a weight average molecular weight of about 6,000 g/mol to about 80,000 g/mol, about 6,000 g/mol to about 70,000 g/mol, about 6,000 g/mol to about 60,000 g/mol, about 6,000 g/mol to about 50,000 g/mol, about 6,000 g/mol to about 40,000 g/mol, about 6,000 g/mol to about 30,000 g/mol, about 6,000 g/mol to about 20,000 g/mol, about 6,000 g/mol to about 10,000 g/mol, or about 20,000 g/mol to about 40,000 g/mol. For example, the resin composition may include the above-described urethane (meth) acrylate oligomer (UF-C051).

The resin composition of an embodiment may include at least one photoinitiator. When a plurality of photoinitiators are included, different photoinitiators may be activated by ultraviolet light with different center wavelengths.

The photoinitiator may be any one or more of 2,2-dimethoxy-1,2-diphenylethan-1-one, 1-hydroxy-cyclo-hexyl-phenyl-ketone, 2-hydroxy-2-methyl-1-phenyl-1-propanone, 2-hydroxy-1-[4-(2-hydroxyethoxy)phenyl]-2-methyl-1-propanone, or 2-hydroxy-1-{4-[4-(2-hydroxy-2-methyl-propionyl)-benzyl]-phenyl}-2-methylpropan-1-one.

In an embodiment, the photoinitiator may be any one or more of 2-methyl-1[4-(methylthio)phenyl]-2-morpholino-propan-1-one, 2-benzyl-2-dimethylamino-1-(4-morpholino-phenyl)-butanone-1, 2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethylbenzoyl)-phenylphosphine oxide, [1-(4-phenylsulfanylbenzoyl)heptylideneamino]benzoate, [1-[9-ethyl-6-(2-methylbenzoyl)carbazol-3-yl]ethylideneamino] acetate, or bis(2,4-cyclopentadienyl)bis[2,6-difluoro-3-(1-pyrryl)phenyl] titanium(IV).

The resin composition of an embodiment may include a radical polymerization initiator. When light is irradiated on the resin composition, the radical polymerization initiator may decompose and generate radicals, and by the generated radicals, a polymerization reaction may be performed repeatedly. For example, the resin composition of an embodiment may include Omnirad TPO-H (a self-cleavage type radical polymerization initiator), Esacure 3644 (a hydrogen-drawing type radical polymerization initiator), or Omnirad 819 (a self-cleavage type radical polymerization initiator).

The resin composition of an embodiment may not include a separate organic solvent. Alternatively, the resin composition of an embodiment may include an organic solvent, wherein the organic solvent may be included in an amount of about 1 wt % or less based on 100 wt % of the total resin composition content. For example, the organic solvent may be included in an amount of about 0.001 wt % to about 1 wt %, about 0.1 wt % to about 1 wt %, about 0.2 wt % to about 1 wt %, about 0.4 wt % to about 1 wt %, about 0.6 wt % to about 1 wt %, or about 0.8 wt % to about 1 wt % based on 100 wt % of the total resin composition content. The resin composition of an embodiment may have improved processability by not including an organic solvent or by including an organic solvent in an amount of about 1 wt % or less. In an embodiment, by minimizing or reducing a time and cost of a drying process for drying an organic solvent, the efficiency of a curing process of the resin composition may be improved.

When the resin composition of an embodiment satisfies the above viscosity and glass transition temperature ranges and includes the above-described compounds, it may exhibit improved adhesive strength and bending resistance after being cured. In an embodiment, when an adhesive member formed of the resin composition is applied to a foldable display device, the folding properties and durability of the display device may be improved.

The display panel DP may include a base substrate BS, a circuit layer DP-CL disposed on the base substrate BS, a display element layer DP-EL disposed on the circuit layer DP-CL, and an encapsulation layer TFE covering the display element layer DP-EL. For example, the display panel DP may include a plurality of organic light emitting elements or a plurality of quantum dot light emitting elements in the display element layer DP-EL.

Configurations of the display panel DP proposed in FIG. 7 and the like are illustrative, and the configuration of the display panel DP is not limited to ones illustrated in FIG. 7 and the like. For example, the display panel DP may include a liquid crystal element, in which case the encapsulation layer TFE may be omitted.

The input sensing unit TP may be disposed on the display panel DP. For example, the input sensing unit TP may be directly disposed on the encapsulation layer TFE of the display panel DP. The input sensing unit TP senses an external input and changes the same into a predetermined input signal, and may provide the input signal to the display panel DP. For example, in the display device DD of an embodiment, the input sensing unit TP may be a touch sensing unit for sensing a touch. The input sensing unit TP may sense a direct touch of a user, an indirect touch of a user, a direct touch of an object, or an indirect touch of an object, and the like. In an embodiment, the input sensing unit TP may sense at least one of the position of a touch or the intensity (pressure) of a touch, which is applied externally. The input sensing unit TP in an embodiment of the inventive concept may have various configurations, or may be composed of various suitable materials, and is not limited to any one embodiment. The input sensing unit TP may include a plurality of sensing electrodes (not shown) for sensing an external input. The sensing electrodes (not shown) may sense an external input in a capacitive manner. The display panel DP is provided with an input signal from the input sensing unit TP, and may generate an image corresponding to the input signal.

The window WP may protect the display panel DP, the input sensing unit TP, and the like. The image IM generated in the display panel DP may transmit through the window WP and be provided to a user. The window WP may provide a touch surface of display device DD. In the display device DD including the folding region FA, the window WP may be a flexible window.

The window WP may include a base layer BL and a print layer BM. The window WP may include a transmission region TA and a bezel region BZA as shown in FIG. 6. The front surface of the window WP including the transmission region TA and the bezel region BZA corresponds to the front surface of the display device DD.

The transmission region TA may be an optically transparent region. The bezel region BZA may be a region having a relatively low light transmittance compared to the transmission region TA. The bezel region BZA may have a predetermined color. The bezel region BZA is adjacent to the transmission region TA, and may surround the transmission region TA. The bezel region BZA may define the shape of the transmission region TA. However, the embodiment is not limited to what is illustrated. The bezel region BZA may be disposed adjacent to only one side of the transmission region TA, or a portion thereof may be omitted.

The base layer BL may include a glass or plastic substrate. For example, a tempered glass substrate may be used as the base layer BL. Alternatively, the base layer BL may be formed of a polymer resin having flexibility. For example, the base layer BL may be made of polyimide, polyamide, polyacrylate, polymethyl methacrylate, polycarbonate, polyethylene naphthalate, polyvinylidene chloride, polyvinylidene difluoride, polystyrene, an ethylene vinyl alcohol copolymer, or a combination thereof. However, the embodiment of the inventive concept is not limited thereto. Any suitable type known for use as the base layer BL of the window WP in the art may be used without limitation.

The print layer BM may be disposed on one surface of the base layer BL. In an embodiment, the print layer BM may be provided on a lower surface of the base layer BL which is adjacent to the display module DM. The print layer BM may be disposed in an edge region of the base layer BL. The print layer BM may be an ink print layer. In an embodiment, the print layer BM may be a layer formed by including a pigment or a dye. In the window WP, the bezel region BZA may be a portion in which the print layer BM is provided.

In an embodiment, the window WP may further include at least one functional layer (not shown) provided on the base layer BL. For example, the functional layer (not shown) may be a hard coating layer, an anti-fingerprint layer, or the like, but the embodiment of the inventive concept is not limited thereto.

In an embodiment, there may be a step between a portion in which the print layer BM is provided and the base layer BL in which the print layer BM is not provided. The adhesive member AP of an embodiment formed from the resin composition of an embodiment described above has excellent or improved flexibility and high or improved adhesion force, and thus, may be attached to the window WP without being separated at the step portion.

The adhesive member AP according to an embodiment may include a polymer derived from the resin composition of an embodiment described above. That is, the adhesive member AP of an embodiment may include a polymer derived from a resin composition including at least one of a monofunctional (meth)acrylate having an imide ring structure or a monomer having a 2-pyrrolidone skeleton and a radical curable group in an amount of about 0.1 wt % to about 5 wt % based on the total weight of the resin composition, wherein the resin composition has a viscosity of about 5 mPa·s to less than about 50 mPa·s at 25° C. as measured according to JIS K2283, and wherein the glass transition temperature of the resin composition after being cured is about −50° ° C. to less than about 0° C. For example, the polymer may be the resin composition of an embodiment that is photocured.

The adhesive member AP of an embodiment may include a polymer derived from a resin composition further including any one of a urethane (meth) acrylate oligomer, a radical polymerization initiator, and a photoinitiator. The same descriptions as those described with reference to the resin composition of an embodiment described herein may be applied to the urethane (meth) acrylate oligomer, the radical polymerization initiator, and the photoinitiator.

The adhesive member AP according to an embodiment may have a 180° peel strength of about 1000 gf/25 mm or greater. Accordingly, the adhesive member AP according to an embodiment may have excellent or improved bending resistance and durability. A detailed description about the measurement of peel strength and the like will be further described below.

The adhesive member AP included in the display device DD of an embodiment may be formed by providing a liquid resin composition on a, e.g., on one surface of the window WP or a, e.g., on one surface of the display module DM, and ultraviolet curing the liquid resin composition provided between the window WP and the display module DM. In an embodiment, the adhesive member AP may be provided by ultraviolet curing a liquid resin composition in a separate process to provide the adhesive member AP, followed by laminating one surface of the cured adhesive member AP in the form of an adhesive film on one surface of the window WP or one surface of the display module DM, and attaching one side of the window WP or one side of the display module DM which is unattached to the other surface of the adhesive member AP.

The thickness of the adhesive member AP may be about 50 micrometer (μm) to about 200 μm. For example, the adhesive member AP may have a thickness of about 100 μm to about 150 μm, about 50 μm to about 150 μm, or about 75 μm to about 200 μm.

Figure 8A:
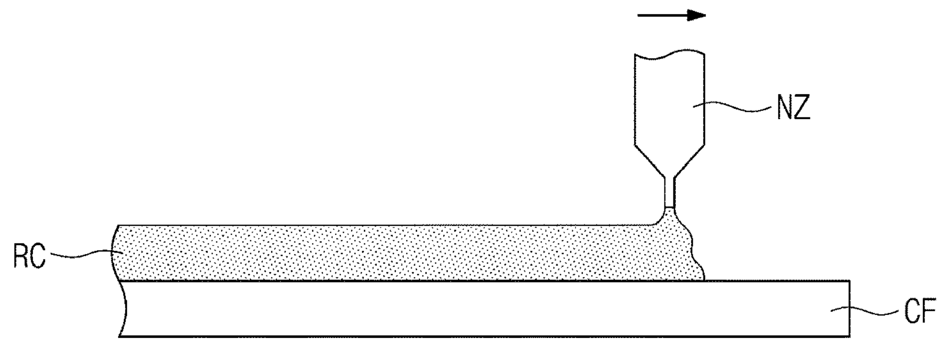
FIG. 8A, FIG. 8B, and FIG. 8C are views showing a method for preparing an adhesive member of an embodiment of the inventive concept.
Figure 8B:
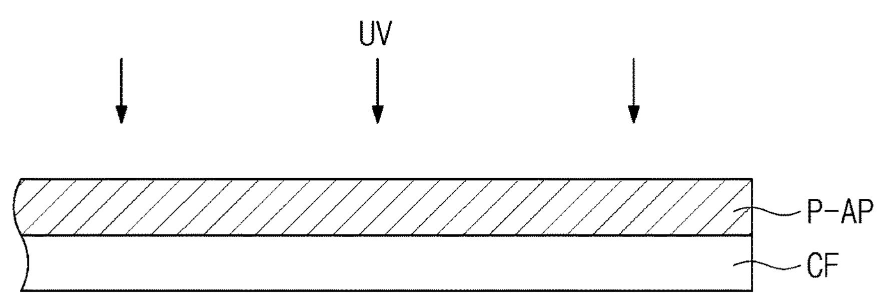
Figure 8C:
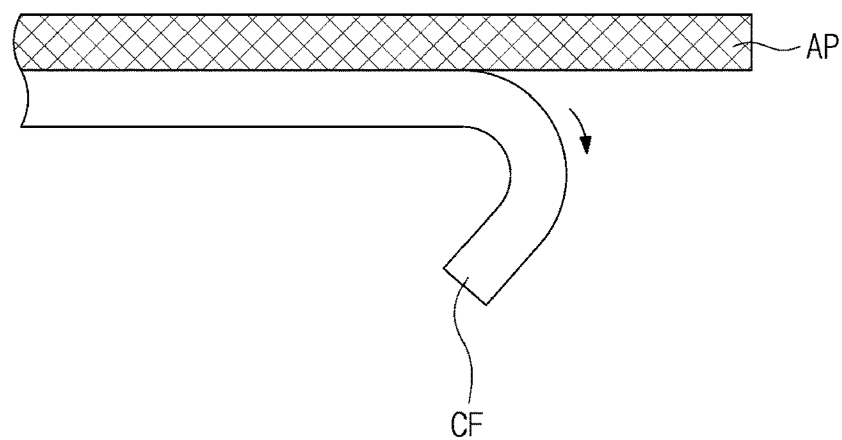

FIG. 8A to FIG. 8C are views schematically showing steps of preparing the adhesive member AP according to an embodiment. FIG. 8A shows a step of providing a resin composition RC for the formation of the adhesive member AP, FIG. 8B shows a step of irradiating ultraviolet light, and FIG. 8C shows a step of removing a carrier film CF.

Referring to FIG. 8A to FIG. 8C, the resin composition RC of an embodiment may be provided on the carrier film CF. For example, a polyethylene terephthalate (PET) film and the like may be used as the carrier film CF, but the embodiment of the inventive concept is not limited thereto. The carrier film CF serves as a substrate for coating a liquid resin composition RC, and any suitable carrier film that may be easily detached from the adhesive member AP after ultraviolet curing may be used. For example, a, e.g., one, surface of the carrier film CF on which the resin composition RC is provided may be release-treated.

The resin composition RC may be provided by a method such as an ink-jet printing method or other dispensing method. The resin composition RC of an embodiment has a viscosity value of about 5 mPa·s to less than about 50 mPa·s at 25° C. as measured according to JIS K2283, and thus, may be easily discharged from the nozzle NZ or the like, and may be provided to maintain a predetermined coating thickness.

A preliminary (i.e., precursor) adhesive member P-AP provided by coating the resin composition RC to a predetermined thickness may be irradiated with ultraviolet light UV. FIG. 8B illustrates that the ultraviolet light UV is directly irradiated on a coated preliminary adhesive member P-AP, but the embodiment of the inventive concept is not limited thereto. In an embodiment, an auxiliary carrier film (not shown) may be further disposed on the preliminary adhesive member P-AP, and the auxiliary carrier film (not shown) transmits ultraviolet light and may cover the preliminary adhesive member P-AP during an ultraviolet curing process.

The adhesive member AP may be formed after the ultraviolet curing. The adhesive member AP may be finally provided by removing the carrier film CF used during the process.

The adhesive member AP prepared through the steps of FIG. 8A to FIG. 8C may be applied to the display device DD described above. For example, one surface of the adhesive member AP may be attached on the display module DM, and then the window WP may be subsequently attached on the other surface of the adhesive member AP which faces the one surface attached to the display module DM. In an embodiment, the adhesive member AP may be provided to the display device DD by attaching one surface of the adhesive member AP on one surface of the window WP which is to face the display module DM, and then attaching the other surface of the adhesive member AP facing the one surface of the adhesive member AP attached to the window WP to the display module DM.

Figure 9A:
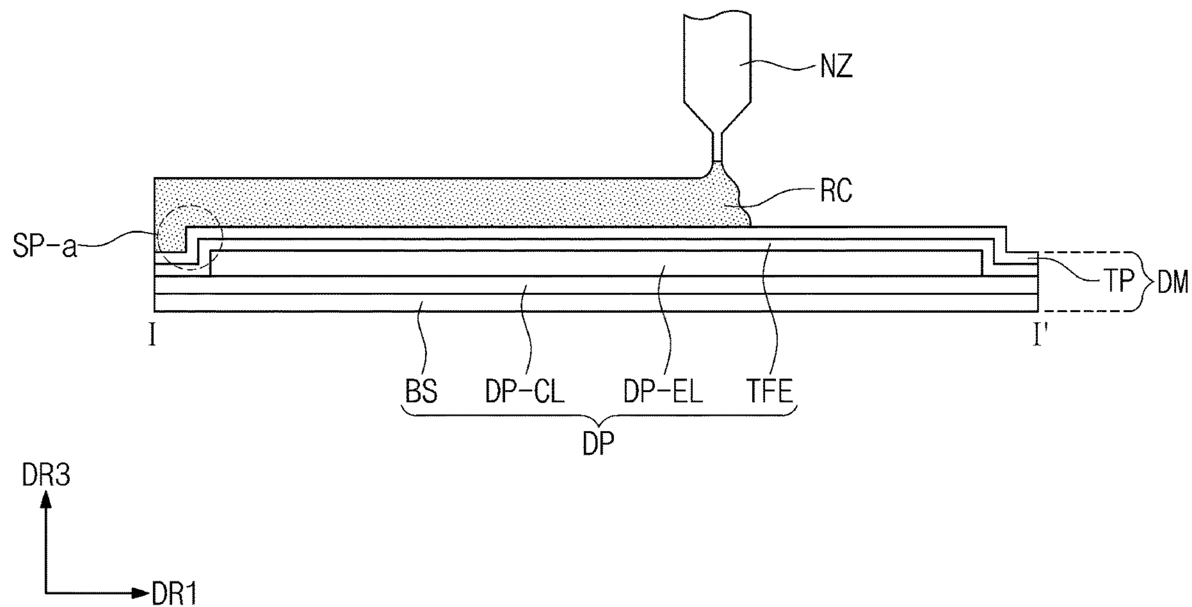
FIG. 9A and FIG. 9B are views showing a method for preparing an adhesive member of an embodiment of the inventive concept.
Figure 9B:
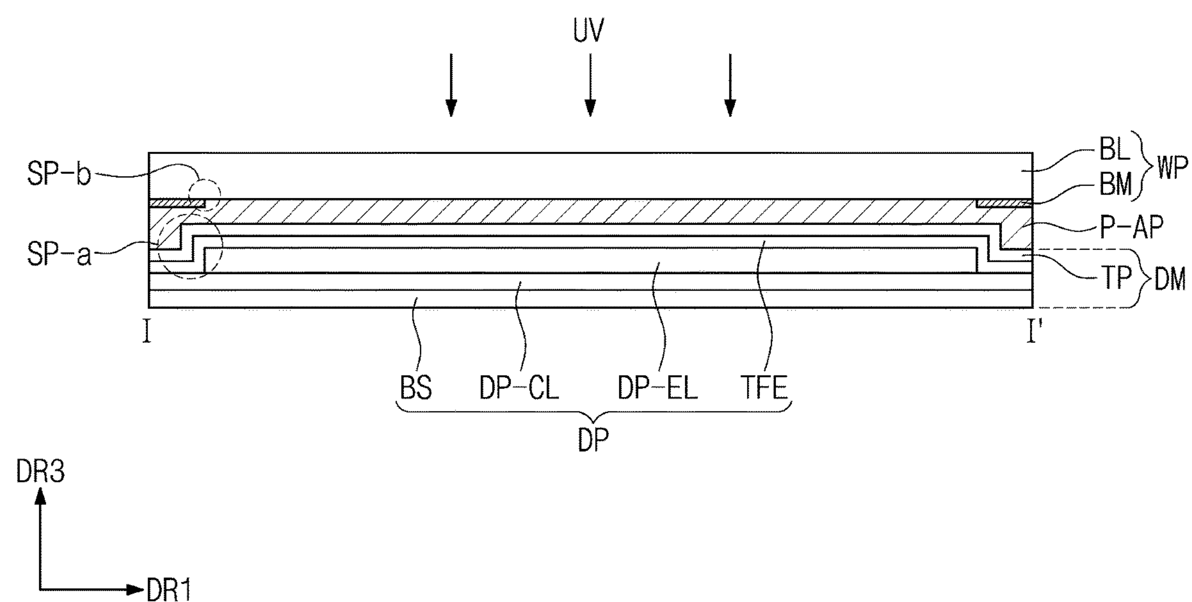

In an embodiment, a liquid resin composition provided between the display module DM and the window WP may be cured to form the adhesive member AP. FIG. 9A and FIG. 9B illustrate steps of preparing the adhesive member AP to be included in the display device DD, which is prepared by a method different from the method for preparing the adhesive member AP described with reference to FIG. 8A to FIG. 8C.

FIG. 9A shows a step of providing the resin composition RC on the display module DM. In addition, FIG. 9B shows a step of irradiating ultraviolet light on the preliminary adhesive member P-AP formed from the resin composition RC.

The resin composition RC may be provided by a method such as an ink-jet printing method or a dispensing method. The resin composition RC of an embodiment satisfies a viscosity value of about 5 mPa·s to less than about 50 mPa·s at 25° C. as measured according to JIS K2283, and thus, may be easily discharged from the nozzle NZ and the like, and may be provided to maintain a predetermined coating thickness while being thin. In an embodiment, the resin composition has a viscosity value of about 5 mPa·s to less than about 50 mPa·s at 25° C. as measured according to JIS K2283, and thus, may be provided while covering the bending of a step portion SP-a of the display module DM. That is, the resin composition RC has a low viscosity value of less than about 50 mPa·s, and thus, may fill a bent portion such as the step portion SP-a without leaving an empty space. In an embodiment, the resin composition RC provided through the nozzle NZ has a viscosity value of about 5 mPa·s or greater, and thus, may be uniformly coated to a predetermined thickness without flowing out of the display module DM.

On the preliminary adhesive member P-AP provided by coating the resin composition RC to a predetermined thickness, the window WP may be provided. The ultraviolet light UV for curing the resin composition RC may be provided by transmitting the window WP. When the window WP is provided on the preliminary adhesive member P-AP, the resin composition RC may fill a step portion SP-b without leaving an empty space. That is, since the resin composition RC has a low viscosity value of about 50 mPa·s or less, the preliminary adhesive member P-AP may be provided in a bent portion such as the step portion SP-a between the base layer BL and the print layer BM while covering the bent shape. The preliminary adhesive member P-AP may be polymerized and then cured by the provided ultraviolet light UV to be formed as the adhesive member AP. The adhesive member AP which is the cured adhesive member AP may satisfy a glass transition temperature (Tg) value of about −50° C. to less than about 0° C. Accordingly, the adhesive member AP may have high or improved flexibility and bendability in low and high temperature environments, and may be applied to a flexible display device and improve the reliability of the display device.

In an embodiment, unlike what is illustrated in FIG. 9B and the like, the ultraviolet light UV may be provided to the preliminary adhesive member P-AP before the window WP is provided on the preliminary adhesive member P-AP, so that a polymerization reaction may proceed in the resin composition RC. The amount of irradiated ultraviolet light UV may be an amount of light which may completely cure the resin composition RC. However, alternatively, the resin composition RC may be partially subjected to the polymerization reaction in the state of the preliminary adhesive member P-AP, and then after the window WP is covered, unreacted resin composition RC may be further reacted to finally form the adhesive member AP.

The display devices DD, DD-a, and DD-b according to an embodiment illustrated in FIG. 1 to FIG. 5 include the adhesive member AP containing a polymer derived from the above-described resin composition of an embodiment, and thus, may use the adhesive member AP to maintain the state in which the window WP and the display module DM are bonded even in a folded state or in a bending region without the separation of the adhesive member AP.

Figure 10:
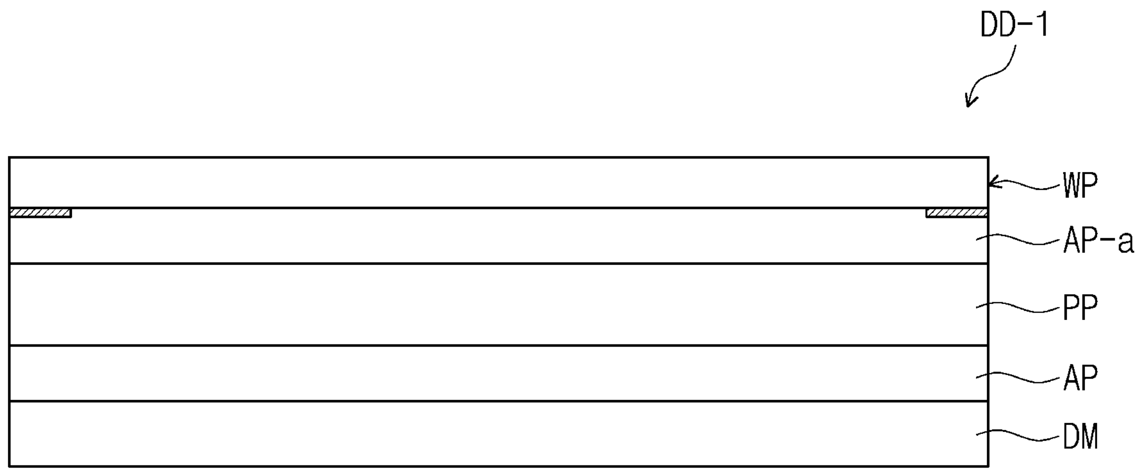
FIG. 10 is a cross-sectional view of a display device according to an embodiment of the inventive concept.

FIG. 10 is a cross-sectional view showing a display device according to an embodiment of the inventive concept. Hereinafter, in the description of the display device of an embodiment illustrated in FIG. 10, the same contents as those described herein with reference to FIG. 1 to FIG. 9B will not be described again. Instead, differences will be mainly described.

Compared to the display device DD described with reference to FIG. 6 and FIG. 7, a display device DD-1 of an embodiment illustrated in FIG. 10 may further include a light control layer PP and an optical adhesive layer AP-a. The display device DD-1 of an embodiment may further include the light control layer PP disposed between the adhesive member AP and the window WP, and the optical adhesive layer AP-a disposed between the light control layer PP and the window WP.

The light control layer PP may be disposed on the display panel DP to control reflective light in the display panel DP caused by external light. The light control layer PP may include, for example, a polarizing layer or a color filter layer.

The optical adhesive layer AP-a may be an optically clear adhesive (OCA) film or an optically clear adhesive (OCR) resin layer. The optical adhesive layer AP-a may also be formed from the resin composition of an embodiment as in the case of the adhesive member AP (see FIG. 7) of an embodiment described above. That is, a resin composition before a reaction by a photoinitiator of the optical adhesive layer AP-a may be applied with the same description for the resin composition described above. Accordingly, the optical adhesive layer AP-a of an embodiment may exhibit high or improved adhesiveness and excellent or improved flexibility.

The display device DD-1 of an embodiment includes the optical adhesive layer AP-a and the adhesive member AP formed from the resin composition of an embodiment, and the optical adhesive layer AP-a and the adhesive member AP have high or improved adhesiveness and excellent or improved flexibility. Therefore, the phenomenon of separation does not occur at an interface of the optical adhesive layer AP-a and the adhesive member AP even in an operational state in which the display device DD-1 is folded or bent, so that excellent or improved reliability properties may be exhibited.

Figure 11:
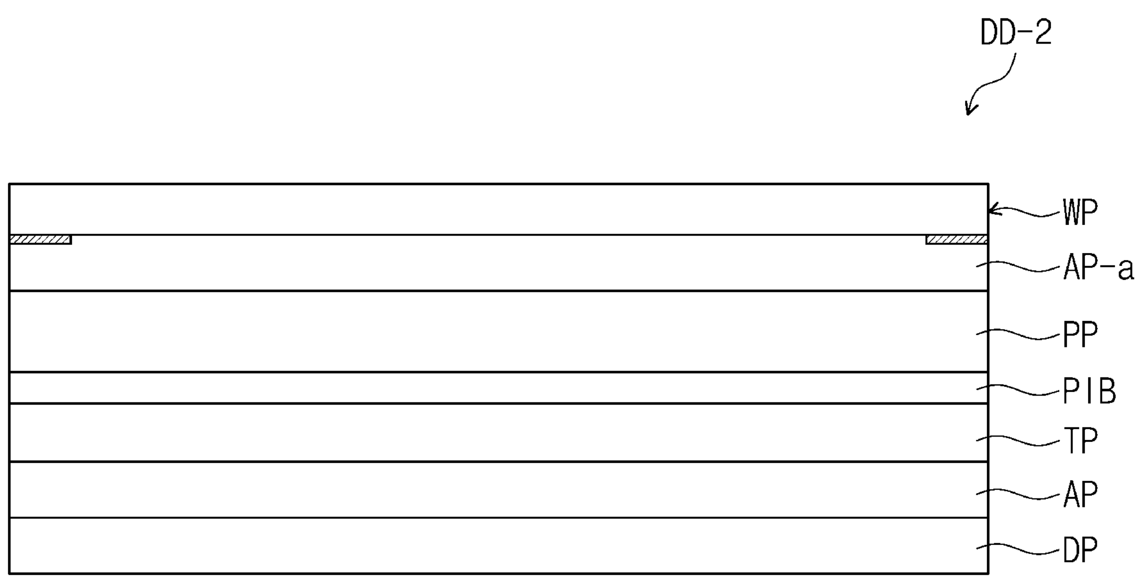
FIG. 11 is a cross-sectional view of a display device according to an embodiment of the inventive concept.

FIG. 11 is a cross-sectional view showing a display device according to an embodiment of the inventive concept. Hereinafter, in the description of the display device of an embodiment illustrated in FIG. 11, the same contents as those described above with reference to FIG. 1 to FIG. 10 will not be described again. Instead, differences will be mainly described.

Compared to the display device DD described with reference to FIG. 6 and FIG. 7, a display device DD-2 of an embodiment illustrated in FIG. 11 may further include the light control layer PP, the optical adhesive layer AP-a, and an interlayer adhesive layer PIB. The display device DD-2 of an embodiment may further include the light control layer PP disposed between the adhesive member AP and the window WP, and the optical adhesive layer AP-a disposed between the light control layer PP and the window WP, as in the case of the display device DD-1 of an embodiment illustrated in FIG. 10.

In the display device DD-2 of an embodiment, the adhesive member AP may be provided between the display panel DP and the input sensing unit TP. That is, the input sensing unit TP is not directly disposed on the display panel DP, but instead, the display panel DP may be bonded to the input sensing unit TP by the adhesive member AP. For example, the adhesive member AP may be disposed between the encapsulation layer TFE (see FIG. 7) of the display panel DP and the input sensing unit TP.

Below the light control layer PP, the interlayer adhesive layer PIB may be provided. The interlayer adhesive layer PIB is disposed between the input sensing unit TP and the light control layer PP, and may be formed of an adhesive material having excellent or improved moisture permeability prevention properties. For example, the interlayer adhesive layer PIB may be formed by including polyisobutylene. The interlayer adhesive layer PIB may be disposed on the input sensing unit TP to prevent the corrosion of sensing electrodes of the input sensing unit TP.

The display device DD-2 of an embodiment includes the optical adhesive layer AP-a and the adhesive member AP formed from the resin composition of an embodiment, and the optical adhesive layer AP-a and the adhesive member AP exhibit high or improved adhesiveness and excellent or improved flexibility. Therefore, the phenomenon of separation does not occur at an interface of the optical adhesive layer AP-a and the adhesive member AP even in an operational state in which the display device DD-2 is folded or bent, so that excellent or improved reliability properties may be exhibited.

Hereinafter, referring to Examples and Comparative Examples, a resin composition according to an embodiment of the inventive concept, an adhesive member, and a display device of an embodiment will be described in detail. The following Examples are for illustrative purposes only to facilitate the understanding of the inventive concept, and thus, the scope of the inventive concept is not limited thereto.

The term "room temperature" used herein refers to a temperature of about 25° C.

EXAMPLES

1. Preparation of Curable Liquid Resin Composition

Resin compositions of Examples were prepared according to blending ratios listed in Table 1, Table 2, and Table 3. Resin compositions of Comparative Examples were prepared according to blending ratios listed in Table 4, Table 5, and Table 6.

Constituent materials of Examples and Comparative Examples were provided in a heat-resistant light-blocking container in the weight (%) disclosed in Table 1 to Table 6, and then 2 wt % of a mixture in which Omnirad TPO-H (2,4,6-trimethylbenzoyl-diphenylphosphine oxide), Esacure 3644 (ketocoumarin), Photomer 4250 (hexahydro-1H-azepine acid 2,2-bis[[(1-oxo-2-propenyl)oxy]methyl]butyl), and Omnirad 819 (phenylbis(2,4,6-trimethylbenzoyl)phosphine oxide) are mixed in a weight ratio of 60:10:1:30 was provided as a photoinitiator based on the total weight of the resin composition. Thereafter, the provided materials were stirred at room temperature for 30 minutes at 1000 rpm using a co-rotating stirring and defoaming device (SHASHIN KAGAKU Co., Ltd) to prepare a curable liquid resin composition.

TABLE 1

| Material (molecular weight, g/mol) | | Example 1 | Example 2 | Example 3 | Example 4 | Example 5 | Example 6 |
|---|---|---|---|---|---|---|---|
| Monomer | IDAA (212) | 65 | 65 | 60 | 65 | 75 | 65 |
| | Medol-10 (200) | 15 | 15 | 15 | 15 | 5 | 15 |
| | IBXA (208) | — | — | — | — | — | — |
| | 4-HBA (144) | 9 | 7 | 5 | 9.9 | 5 | 9.9 |
| | L-A (240) | — | — | — | — | — | — |
| | 2-EHA (184) | — | — | — | — | — | — |
| | HEA (116) | — | — | — | — | — | — |
| | DMAA (99) | — | — | — | — | — | — |
| | DEAA (127) | — | — | — | — | — | — |
| | HEAA (115) | — | — | — | — | — | — |
| Polyurethane Oligomer | UF-C051 (35000) | 10 | 10 | 15 | 10 | 10 | 10 |
| | UN7700 (20000) | — | — | — | — | — | — |
| | UA10000B (25000) | — | — | — | — | — | — |
| Monofunctional (meth)acrylate having ring-shaped imide structure or Monomer having 2-pyrrolidone skeleton and radical curable group | ARONIX M-140 (239) | 1 | 3 | 5 | — | — | — |
| | N-Succinimidyl Acrylate (169) | — | — | — | 0.1 | 5 | — |
| | N-vinyl-2-pyrrolidone (111) | — | — | — | — | — | 0.1 |
| | 2-pyrrolidone-N-ethyl acrylate (183) | — | — | — | — | — | — |
| | 2-pyrrolidone-N-propyl acrylate (197) | — | — | — | — | — | — |

TABLE 2

| Material (molecular weight) | | Example 7 | Example 8 | Example 9 | Example 10 | Example 11 | Example 12 |
|---|---|---|---|---|---|---|---|
| Monomer | IDAA (212) | 75 | 75 | 75 | 75 | 75 | 93 |
| | Medol-10 (200) | 5 | 5 | 5 | 5 | 5 | — |
| | IBXA (208) | — | — | — | — | — | — |
| | 4-HBA (144) | 5 | 7 | 7 | 8 | 8 | 4.9 |
| | L-A (240) | — | — | — | — | — | — |
| | 2-EHA (184) | — | — | — | — | — | — |
| | HEA (116) | — | — | — | — | — | — |
| | DMAA (99) | — | — | — | — | — | — |
| | DEAA (127) | — | — | — | — | — | — |
| | HEAA (115) | — | — | — | — | — | — |
| Polyurethane Oligomer | UF-C051 (35000) | 10 | 10 | 15 | 10 | 10 | 2 |
| | UN7700 (20000) | — | — | — | — | — | — |
| | UA10000B (25000) | — | — | — | — | — | — |
| Monofunctional (meth)acrylate having ring-shaped imide structure or Monomer having 2-pyrrolidone skeleton and radical curable group | ARONIX M-140(239) | — | — | — | — | 1 | — |
| | N-Succinimidyl Acrylate (169) | — | — | — | 1 | 1 | — |
| | N-viny1-2-pyrrolidone (111) | 5 | — | — | 1 | — | 0.1 |
| | 2-pyrrolidone-N-ethyl acrylate (183) | — | 3 | — | — | — | — |
| | 2-pyrrolidone-N-propyl acrylate (197) | — | — | 3 | — | — | — |

TABLE 3

| Material (molecular weight) | | Example 13 | Example 14 | Example 15 |
|---|---|---|---|---|
| Monomer | IDAA (212) | 65 | 65 | 65 |
| | Medol-10 (200) | 15 | 15 | 15 |
| | IBXA (208) | — | — | — |
| | 4-HBA (144) | 9 | 9 | 9 |
| | L-A (240) | — | — | — |
| | 2-EHA (184) | — | — | — |
| | HEA (116) | — | — | — |
| | DMAA (99) | — | — | — |
| | DEAA (127) | — | — | — |
| | HEAA (115) | — | — | — |
| Polyurethane Oligomer | UF-0051 (35000) | 10 | 10 | 10 |
| | UN7700 (20000) | — | — | — |
| | UA10000B (25000) | — | — | — |
| Monofunctional (meth)acrylate having ring-shaped imide structure or Monomer having 2-pyrrolidone skeleton and radical curable group | ARONIX M-140 (239) | 1 | 1 | 1 |
| | N-Succinimidyl Acrylate (169) | — | — | — |
| | N-vinyl-2-pyrrolidone (111) | — | — | — |
| | 2-pyrrolidone-N-ethyl acrylate (183) | — | — | — |
| | 2pyrrolidone-N-propyl acrylate (197) | — | — | — |
| Organic solvent | MEK (72) | 1 | — | — |
| | Ethanol (46) | — | 1 | — |
| | Acetone (58) | — | — | 1 |

TABLE 4

| Material (molecular weight) | | Comparative Example 1 | Comparative Example 2 | Comparative Example 3 | Comparative Example 4 | Comparative Example 5 | Comparative Example 6 |
|---|---|---|---|---|---|---|---|
| Monomer | IDAA (212) | 65 | 60 | 84.9 | 65 | 88 | — |
| | Medol-10 (200) | 15 | 10 | — | 5 | — | — |

TABLE 4-continued

| Material (molecular weight) | | Comparative Example 1 | Comparative Example 2 | Comparative Example 3 | Comparative Example 4 | Comparative Example 5 | Comparative Example 6 |
|---|---|---|---|---|---|---|---|
| | IBXA (208) | — | — | — | — | — | — |
| | 4-HBA (144) | 10 | 10 | — | 9 | 10 | — |
| | L-A (240) | — | — | — | — | — | — |
| | 2-EHA (184) | — | — | — | — | — | 30 |
| | HEA (116) | — | — | — | — | — | 30 |
| | DMAA (99) | — | — | — | — | — | — |
| | DEAA (127) | — | — | — | — | — | — |
| | HEAA (115) | — | — | — | — | — | — |
| Polyurethane Oligomer | UF-C051 (35000) | 10 | 10 | 15 | 20 | 1 | 40 |
| | UN7700 (20000) | — | — | — | — | — | — |
| | UA10000B (25000) | — | — | — | — | — | — |
| Monofunctional (meth)acrylate having ring-shaped imide structure or Monomer having 2-pyrrolidone skeleton and radical curable group | ARONIX M-140(239) | — | — | — | — | — | — |
| | N-Succinimidyl Acrylate (169) | — | — | 0.1 | — | — | — |
| | N-viny1-2-pyrrolidone (111) | — | 10 | — | 1 | 1 | — |
| | 2-pyrrolidone-N-ethyl acrylate (183) | — | — | — | — | — | — |
| | 2-pyrrolidone-N-propyl acrylate (197) | — | — | — | — | — | — |

TABLE 5

| Material (molecular weight) | | Comparative Example 7 | Comparative Example 8 | Comparative Example 9 | Comparative Example 10 | Comparative Example 11 | Comparative Example 12 |
|---|---|---|---|---|---|---|---|
| Monomer | IDAA (212) | 60 | 60 | 60 | — | — | — |
| | Medol-10 (200) | 15 | 15 | 15 | — | — | — |
| | IBXA (208) | — | — | — | 40 | 40 | 40 |
| | 4-HBA (144) | 5 | 5 | 5 | 20 | 20 | 20 |
| | L-A (240) | — | — | — | 20 | 20 | 20 |
| | 2-EHA (184) | — | — | — | — | — | — |
| | HEA (116) | — | — | — | — | — | — |
| | DMAA (99) | 5 | — | — | — | — | — |
| | DEAA (127) | — | 5 | — | — | — | — |
| | HEAA (115) | — | — | 5 | — | — | — |
| Polyurethane Oligomer | UF-0051 (35000) | 15 | 15 | 15 | — | — | — |
| | UN7700 (20000) | — | — | — | — | 20 | 10 |
| | UA10000B (25000) | — | — | — | 20 | — | — |
| Monofunctional (meth)acrylate having ring-shaped imide structure or Monomer having 2-pyrrolidone skeleton and radical curable group | ARONIX M-140 (239) | 5 | — | — | — | — | — |
| | N-Succinimidyl Acrylate (169) | — | — | — | — | — | — |
| | N-viny1-2-pyrrolidone (111) | — | — | — | — | — | — |
| | 2-pyrrolidone-N-ethyl acrylate (183) | — | — | — | — | — | — |
| | 2-pyrrolidone-N-propyl acrylate (197) | — | — | — | — | — | — |

TABLE 6

| Material (molecular weight) | | Comparative Example 13 | Comparative Example 14 | Comparative Example 15 | Comparative Example 16 | Comparative Example 17 | Comparative Example 18 | Comparative Example 19 |
|---|---|---|---|---|---|---|---|---|
| Monomer | IDAA (212) | 65 | 65 | 65 | 65 | — | — | — |
| | Medol-10 (200) | 15 | 15 | 15 | 15 | — | — | — |
| | IBXA (208) | — | — | — | — | — | — | — |
| | 4-HBA (144) | 9 | 9 | 9 | 9 | 94 | 90 | 94 |
| | L-A (240) | — | — | — | — | 1.80 | — | — |
| | 2-EHA (184) | — | — | — | — | | — | — |
| | HEA (116) | — | — | — | — | — | — | — |
| | DMAA (99) | — | — | — | — | — | — | — |
| | DEAA (127) | — | — | — | — | — | — | — |
| | HEAA (115) | — | — | — | — | — | 10 | — |
| | AA (72) | — | — | — | — | 6 | — | — |
| Polyurethane Oligomer | UF-C051 (35000) | 10 | 10 | 10 | 10 | | | — |
| | UN7700 (20000) | — | — | — | — | — | — | — |
| | UA10000B (25000) | — | — | — | — | — | — | — |
| Monofunctional (meth)acrylate having ring-shaped imide structure or Monomer having 2-pyrrolidone skeleton and radical curable group | ARONIX M-140 (239) | 1 | 1 | 1 | 1 | — | — | — |
| | N-Succinimidyl Acrylate (169) | — | — | — | — | — | — | — |
| | N-vinyl-2-pyrrolidone (111) | — | — | — | — | — | — | — |
| | 2-pyrrolidone-N-ethyl acrylate (183) | — | — | — | — | — | — | — |
| | 2-pyrrolidone-N-propyl acrylate (197) | — | — | — | — | — | — | — |
| Multifunctional acrylate | 1,6-HX-A (226) | — | — | — | — | 0.2 | 0.2 | 0.2 |
| | NK Oligo UA-1013P (14000) | — | — | — | — | — | — | 2 |
| Organic solvent | MEK(72) | 2 | 10 | — | — | — | — | — |
| | Ethanol (36) | — | — | 10 | — | — | — | — |
| | Acetone (58) | — | — | — | 10 | — | — | — |

Data on Materials Used as Constituent Components of Examples and Comparative Examples Data on each constituent component used in Examples and Comparative Examples disclosed in Table 1 to Table 6 above are as follows.

Monomer

IDAA: Isodecyl acrylate

Medol-10: 2-methyl-2-ethyl-1,3dioxolan-4-ylmethyl-acrylate

IBXA: Isobornyl acrylate

FA-512AS: Dicyclopentenyloxyethyl acrylate

4-HBA: 4-hydroxy butyl acrylate

L-A: Lauryl acrylate

2-EHA: 2-ethylhexyl acrylate

HEA: Hydroxy ethyl acrylate

DMAA: Dimethyl acrylamide

DEAA: Diethyl acrylamide

HEAA: Hydroxy ethyl acrylamide

AA: Acrylic acid

Oligomer

UF-C051: Urethane acrylate

UN-7700: Urethane acrylate

UA10000B: Urethane acrylate

Monofunctional (meth)acrylate having ring-shaped imide structure

ARONIX M-140: N-acryloyloxyethylhexahydrophthal-imide

N-Succinimidyl Acrylate: N-acryloyloxysuccinimide

Monomer having 2-pyrrolidone skeleton and radical curable group

N-vinyl-2-pyrrolidone: Monomer having 2-pyrrolidone skeleton and radical curable group 2-pyrrolidone-N-ethyl acrylate: Monomer having 2-pyrrolidone skeleton and radical curable group 2-pyrrolidone-N-propyl acrylate: Monomer having 2-pyrrolidone skeleton and radical curable group Multifunctional Acrylate 1,6HX-A: 1,6-hexanediol diacrylate (light acrylate)

NK Oligo UA-1013P: Polypropylene oxide urethane acrylate

Initiator

Omnirad TPO-H: 2,4,6-trimethylbenzoyl-diphenylphosphine oxide

Esacure 3644: Ketocoumarin

Photomer 4250: Hexahydro-1H-azepine acid 2,2-bis[[(1-oxo-2-propenyl)oxy]methyl]butyl Omnirad 819: Phenylbis(2,4,6-trimethylbenzoyl)phosphine oxide Organic Solvent MEK: Methylethylketone

2. Evaluation of Physical Properties of Resin Composition and Adhesive Member Formed from Resin Composition In Table 7 and Table 8, the viscosity of a resin composition having a composition ratio of each of Table 1 to Table 6 above, the glass transition temperature of a cured product obtained by curing each composition, the properties and ink-jet ability of the cured product, the 180° peel strength of the cured product, the high temperature durability of the cured product, and the low temperature durability of the cured product were measured and shown.

Specifically, in Table 7, the measurement results of the resin compositions of Examples of Table 1 to Table 3 above are shown. In Table 8, the measurement results of the resin compositions of Comparative Examples of Table 4 to Table 6 above are shown.

The viscosity of a resin composition, the glass transition temperature of the cured product, the properties and ink-jet ability of the cured product, the 180° peel strength of the cured product, the high temperature durability of the cured product, and the low temperature durability of the cured product were measured in the following manner.

Method for Measuring Viscosity

The viscosity of the resin composition described in the present specification was measured at 25° C. according to JIS K2283, and was measured under the rate condition of a 10 rpm using a viscometer TVE-25L (a product of Toki Industry Co., Ltd.).

Measurement of Cured Product Tg

The curable resin composition blended in each of the Examples and Comparative Examples, and was irradiated with ultraviolet light with a metal halide lamp (a conveyor-type UV irradiation device, a product of iGraphics) until an accumulated amount of light of 4000 millijoules per square centimeter (mJ/cm$^2$) was achieved. The Tg of the resin cured product (size: 8 mm in diameter, 0.5 mm in thickness) obtained thereby was measured using a dynamic viscoelasticity measuring device (MCR302, a product of Anton Paar Co., Ltd.). The measurement conditions were a frequency of 1 hertz (Hz), a temperature range of 70° C. to 80° C., and a temperature raising rate of 10° C./min.

Evaluation of Cured Product Reliability

Using the curable resin composition blended in each of Examples and Comparative Examples, a polyethylene terephthalate film (a product of Toyo Spinning Agent, trade name 'Cosmoshine 4100,' thickness 100 μm) and a slide glass (a product of Matsunami Glass Industry Co., Ltd., trade name 'S1112') were bonded to allow the thickness of the curable resin composition to be 100 μm. After being laminated, ultraviolet light was irradiated from the slide glass side using a metal halide lamp (a conveyor-type UV irradiation device, a product of iGraphics) until an accumulated amount of light of 4000 mJ/cm$^2$ was achieved, thereby curing the curable resin composition to obtain a laminate.

The appearance of the laminate obtained above was observed.

O: White turbidity defect observed.

X: White turbidity defect not observed.

Ink-Jet Ability Evaluation

The curable resin composition blended in each of Examples and Comparative Examples was coated and UV-cured using an ink-jet device (a product of MICROJET Co., Ltd), and the appearance of a coating film after the curing was observed. The observation results were denoted as follows.

O: No Resin composition leaked out and Coating thickness variation not observed.

Δ: Resin composition leaked out and Coating thickness variation observed.

X: Discharge not possible.

Measurement of 180° Peel Strength

The curable resin composition blended in each of Examples and Comparative Examples was coated on a slide glass (a product of Matsunami Glass Industry Co., Ltd., trade name 'S1112') to allow the thickness of the curable resin composition to be 100 μm. Thereafter, using UV-LED having a wavelength peak in the range of 365+5 nanometer (nm), ultraviolet light having an intensity of 100 milliwatt per square centimeter (mW/cm$^2$) was irradiated for 2 seconds to form a UV partially cured product layer.

The formed UV partially cured product layer was laminated with a polyimide film (a product of Toray•DuPont Co., Ltd., trade name 'Kapton,' thickness 75 μm), and then subjected to processing for 5 minutes using an automatic heating and pressing processing device (a product of Chiyoda Electronics Co., Ltd., trade name 'ACS-230') under the conditions of 30° C. and 0.5 MPa.

Thereafter, using UV-LED having a wavelength peak in the range of 395+5 nm, ultraviolet light having an intensity of 500 mW/cm$^2$ was irradiated from the polyimide film side for 4 seconds to obtain a laminate.

Using the laminate, a 180° peel test was performed with a tensile tester (a product of INSTRON Co., Ltd., INSTRON 5965-type). The measurement conditions were a temperature of 25° C. and a tensile rate of 300 millimeters per minute (mm/min).

Measurement of High-Temperature Durability

A polyimide film/resin cured product/slide glass laminate was obtained in the same way as in the 180° peel strength measurement. The laminate obtained above was maintained in a high temperature or high temperature/high humidity (85° ° C., 85% RH) environment for 72 hours to observe the occurrence of separation, resin deformation, and the like in an adherend.

O: No appearance change

X: Separation observed

Low-Temperature Durability Measurement

A polyimide film/resin cured product/slide glass laminate was obtained in the same way as in the 180° peel strength measurement. The laminate obtained above was maintained in a low temperature)(−20° ° C. environment for 72 hours to observe the occurrence of separation, resin deformation, and the like in an adherend.

O: No appearance change

X: Separation observed

TABLE 7

| Evaluation Sample | Viscosity [mPa · s] | Cured product Tg [° C.] | Cured product reliability evaluation | Ink-jet ability evaluation | 180° peel strength [gf/25 mm] | High-temperature durability evaluation | Low-temperature durability evaluation |
|---|---|---|---|---|---|---|---|
| Example 1 | 17 | −32 | ○ | ○ | 1420 | ○ | ○ |
| Example 2 | 24 | −22 | ○ | ○ | 1610 | ○ | ○ |
| Example 3 | 48 | −2 | ○ | ○ | 2110 | ○ | ○ |
| Example 4 | 19 | −34 | ○ | ○ | 1120 | ○ | ○ |
| Example 5 | 23 | −20 | ○ | ○ | 1730 | ○ | ○ |
| Example 6 | 18 | −35 | ○ | ○ | 1530 | ○ | ○ |
| Example 7 | 16 | −14 | ○ | ○ | 2810 | ○ | ○ |

TABLE 7-continued

| Evaluation Sample | Viscosity [mPa · s] | Cured product Tg [° C.] | Cured product reliability evaluation | Ink-jet ability evaluation | 180° peel strength [gf/25 mm] | High-temperature durability evaluation | Low-temperature durability evaluation |
|---|---|---|---|---|---|---|---|
| Example 8 | 18 | −27 | ○ | ○ | 2560 | ○ | ○ |
| Example 9 | 18 | −33 | ○ | ○ | 2390 | ○ | ○ |
| Example 10 | 20 | −17 | ○ | ○ | 2360 | ○ | ○ |
| Example 11 | 24 | −21 | ○ | ○ | 1790 | ○ | ○ |
| Example 12 | 5.1 | −49 | ○ | ○ | 1270 | ○ | ○ |
| Example 13 | 16 | −32 | ○ | ○ | 1320 | ○ | ○ |
| Example 14 | 16 | −32 | ○ | ○ | 1280 | ○ | ○ |
| Example 15 | 16 | −32 | ○ | ○ | 1290 | ○ | ○ |

Referring to the results in Table 7, the resin composition of each of Example 1 to Example 15 had a viscosity of about 5 mPa·s to less than about 50 mPa·s when in the state of a composition, and thus, may be used to form a coating film having a uniform thickness, and was all normally coated in the ink-jet ability evaluation. The resin composition of each of Example 1 to Example 15 satisfied a glass transition temperature (Tg) of about −50° C. to less than about 0° C. when in the state of a cured product, and thus, exhibited excellent or improved flexibility and durability in the high-temperature durability evaluation and low-temperature durability evaluation of the cured product.

The resin composition of each of Example 1 to Example 15 included at least one of a monofunctional (meth)acrylate having an imide ring structure or a monomer having a 2-pyrrolidone skeleton and a radical curable group in an amount of about 0.1 wt % to about 5 wt %, and thus, exhibited high or improved peel strength. Specifically, the resin composition of each of Example 1 to Example 15 was confirmed to have a peel strength value of about 1000 gf/25 mm or greater for the polyimide film.

In addition, it was confirmed that the resin composition of each of Example 1 to Example 12 in which an organic solvent was not included and the resin composition of each of Example 13 to Example 15 in which an organic solvent was included in an amount of 1 wt % or less had no white turbidity and curing defects during curing.

TABLE 8

| Evaluation Sample | Viscosity [mPa · s] | Cured product Tg [° C.] | Cured product Reliability evaluation | Ink-jet ability evaluation | 180° peel strength [gf/25 mm] | High-temperature durability evaluation | Low-temperature durability evaluation |
|---|---|---|---|---|---|---|---|
| Comparative Example 1 | 17 | −33 | ○ | ○ | 420 | ○ | ○ |
| Comparative Example 2 | 34 | 25 | ○ | ○ | 1230 | ○ | X |
| Comparative Example 3 | 28 | −57 | ○ | ○ | 1080 | X | ○ |
| Comparative Example 4 | 62 | −36 | ○ | Δ | 1420 | ○ | ○ |
| Comparative Example 5 | 3.2 | −31 | ○ | Δ | 1470 | ○ | ○ |
| Comparative Example 6 | 3800 | −28 | ○ | X | 590 | ○ | ○ |
| Comparative Example 7 | 45 | 44 | ○ | ○ | 790 | ○ | X |
| Comparative Example 8 | 46 | 24 | ○ | ○ | 670 | ○ | X |
| Comparative Example 9 | 79 | 37 | ○ | Δ | 820 | ○ | X |
| Comparative Example 10 | 144 | 39 | ○ | Δ | 860 | ○ | X |
| Comparative Example 11 | 88 | 54 | ○ | Δ | 320 | ○ | X |
| Comparative Example 12 | 28 | 75 | ○ | ○ | 540 | ○ | X |
| Comparative Example 13 | 15 | −33 | X | ○ | 920 | ○ | ○ |
| Comparative Example 14 | 11 | Not measurable | X | ○ | Not measurable | X | X |
| Comparative Example 15 | 12 | Not measurable | X | ○ | Not measurable | X | X |
| Comparative Example 16 | 11 | Not measurable | X | ○ | Not measurable | X | X |

Referring to the results of Table 8, the resin composition of Comparative Example 1 did not include a monofunctional (meth)acrylate having an imide ring structure or a monomer having a 2-pyrrolidone skeleton and a radical curable group, and had a degraded 180° peel strength for the polyimide film. The resin composition of Comparative Example 2 included 10 wt % of a monomer having 2-pyrrolidone skeleton and radical curable group, so that the glass transition temperature (Tg) of the cured product was greatly increased, and durability of the cured product was degraded at low temperatures.

The resin composition of Comparative Example 3 had a glass transition temperature (Tg) value of less than −50° C., and thus, the durability thereof was degraded at high temperatures. Specifically, the deformation of the cured product and the peeling of the adherend were confirmed in the high temperature/high humidity (85° C., 85% RH) environment.

The resin compositions of Comparative Example 4 and Comparative Example 5 respectively had a viscosity value of 50 mPa·s or greater, and of less than 5 mPa·s, so that when the resin composition was coated using an ink-jet printer, it was confirmed that the precise coating thereof was difficult to achieve. Specifically, when the viscosity is 50 mPa·s or greater, there is a variation in thickness after a resin composition is discharged. When the viscosity is less than 5 mPa·s, there is a discharge defect of the resin composition, which may make it difficult to form a pattern.

The resin composition of Comparative Example 6 included a urethane oligomer in an amount of 40 wt %, and thus, had a greatly increased viscosity, and it was difficult to coat a resin with an ink-jet printer. In addition, the resin composition of Comparative Example 6 did not include a monofunctional (meth)acrylate having an imide ring structure or a monomer having a 2-pyrrolidone skeleton and a radical curable group, and thus, exhibited low adhesion force for the polyimide film.

The resin composition of each of Comparative Example 7 to Comparative Example 9 did not include the monofunctional (meth)acrylate having an imide ring structure, or the monomer having a 2-pyrrolidone skeleton and a radical curable group of the inventive concept, but included an acrylamide (DMAA, DEAA, or HEAA) in an amount of 5 wt %, so that the Tg of the cured product was greatly increased. Accordingly, in the resin composition of each of Comparative Example 7 to Comparative Example 9, the flexibility of the cured product was degraded, and peeling was observed in the evaluation of durability at −20° C. In addition, the resin composition of each of Comparative Example 7 to Comparative Example 9 had low adhesion for the polyimide film and had low peel strength.

The resin composition of each of Comparative 10 and Comparative Example 11 had a viscosity value of 50 mPa·s or greater, so that it was difficult to coat the same and achieve a uniform thickness with an ink-jet printer.

The resin composition of Comparative Example 12 included IBXA as a main component, and thus, had a high Tg, and had low flexibility at low temperatures, peeling was observed in the evaluation of durability at −20° C.

In addition, the resin composition of each of Comparative Examples 10 to 12 had low adhesion for the polyimide film and had low peel strength.

The resin composition of each of Comparative Example 13 to Comparative Example 16 included an organic solvent in an amount of 2 wt % or 10 wt %, the cured product had white turbidity after the irradiation of ultraviolet light, and curing defects were confirmed. In addition, the resin composition of each of Comparative Example 13 to Comparative Example 16 had significantly degraded adhesion for the polyimide film and glass.

The resin composition of each of Comparative Example 17 to Comparative Example 19 did not include the monofunctional (meth)acrylate having an imide ring structure, or the monomer having a 2-pyrrolidone skeleton and a radical curable group of the inventive concept, and thus, exhibited low 180° peel strength for the polyimide film and glass after curing. Particularly, the resin composition of each of Comparative Example 17 to Comparative Example 19 included 4-HBA, which has high moisture absorptiveness and water absorptiveness, in an amount of 50 wt % or greater, there was white turbidity and peeling of the cured product in a high temperature/high humidity environment.

Referring to Table 1 to Table 8, the resin composition of an embodiment has a viscosity of about 5 mPa·s to less than about 50 mPa·s at 25° C. as measured according to JIS K2283, includes at least one of a monofunctional (meth) acrylate having an imide ring structure and a monomer having a 2-pyrrolidone skeleton and a radical curable group in an amount of about 0.1 wt % to about 5 wt %, and satisfies a glass transition temperature of about −50° C. to less than about 0° C. after being cured, and thus, may have or improved coating properties before being cured, and may have improved adhesion force and flexibility, and improved durability in low and high temperature environments after being cured.

The display device of an embodiment includes the adhesive member formed through the resin composition of an embodiment, and thus, exhibits improved reliability since there is no peeling or curing defects of the adhesive member at a bent portion, and may exhibit excellent or improved operational reliability at low and high temperatures.

A resin composition of an embodiment has low-viscosity properties, and thus, may exhibit excellent or improved coating properties for substrates having various shapes.

An adhesive member of an embodiment may have high or improved adhesive strength and excellent or improved bending resistance.

A display device of an embodiment may exhibit excellent or improved reliability in various operational states.

Although the inventive concept has been described with reference to a preferred embodiment of the inventive concept, it will be understood by those skilled in the art that various changes in form and details may be made therein without departing from the spirit and scope of the inventive concept as set forth in the following claims.

Accordingly, the technical scope of the inventive concept is not intended to be limited to the contents set forth in the detailed description of the specification, but is intended to be defined by the appended claims.

What is claimed is:

1. A resin composition comprising:

at least one of a monofunctional (meth)acrylate having an imide ring structure or a monomer having a 2-pyrrolidone skeleton and a radical curable group in an amount of about 0.1 weight percent to about 5 weight percent based on the total weight of the resin composition:

a urethane (meth)acrylate oligomer, wherein the urethane (meth)acrylate oligomer is present in an amount of 2 weight percent to about 15 weight percent based on the total weight of the resin composition, and at least one (meth)acrylate monomer having a molecular weight of about 100 g/mol to about 300 g/mol, wherein the resin composition has a viscosity of about 5 millipascal seconds to less than about 50 millipascal seconds at 25° C., wherein a glass transition temperature of the resin composition after being cured is about −50° C. to less than about 0° C., and wherein a 180° peel strength of the resin composition after being cured on glass or a polyimide film is about 1000 gram-force per 25 millimeter to about 2810 gram-force per 25 millimeter as determined at a temperature of 25° C. and a tensile rate of 300 millimeters per minute.

2. The resin composition of claim 1, wherein the urethane (meth)acrylate oligomer has a weight average molecular weight of about 6000 grams per mole or greater.

3. The resin composition of claim 1, further comprising an organic solvent, wherein the organic solvent is present in an amount of about 1 weight percent or less based on the total weight of the resin composition.

4. The resin composition of claim 1, further comprising a radical polymerization initiator.

5. An adhesive member comprising a polymer derived from a resin composition comprising:

at least one of a monofunctional (meth)acrylate having an imide ring structure, or a monomer having a 2-pyrrolidone skeleton, and a radical curable group, in an amount of about 0.1 weight percent to about 5 weight percent based on the total weight of the resin composition, a urethane (meth)acrylate oligomer, wherein the urethane (meth)acrylate oligomer is present in an amount of about 2 weight percent to about 15 weight percent based on the total weight of the resin composition, and at least one (meth)acrylate monomer having a molecular weight of about 100 g/mol to about 300 g/mol, wherein the resin composition has a viscosity of about 5 millipascal seconds to less than about 50 millipascal seconds at 25° C., wherein a glass transition temperature of the resin composition after being cured is about −50° C. to less than about 0° C., wherein a 180° peel strength of the resin composition after being cured on glass or a polyimide film is about 1000 gram-force per 25 millimeter to about 2810 gram-force per 25 millimeter as determined at a temperature of 25° C. and a tensile rate of 300 millimeters per minute.

6. The adhesive member of claim 5, wherein the polymer is obtained by photo-curing the resin composition.

7. The adhesive member of claim 5, wherein the resin composition further comprises an organic solvent, wherein the organic solvent is present in an amount of about 1 weight percent or less based on the total weight of the resin composition.

8. The adhesive member of claim 5, wherein the monomer having a 2-pyrrolidone skeleton and a radical curable group is present in the resin composition in an amount of 0.1 weight percent to 3.5 weight percent.

9. The adhesive member of claim 5, wherein the monofunctional (meth)acrylate having an imide ring structure is present in the resin composition in an amount of 0.1 weight percent to 3.5 weight percent.

10. The adhesive member of claim 9, wherein the monofunctional (meth)acrylate is N-acryloyloxyethylhexahydrophthalimide, N-acryloyloxysuccinimide, or a combination thereof.

11. The adhesive member of claim 5, wherein the 180° peel strength of the resin composition after being cured on glass or a polyimide film is about 1120 gram-force per 25 millimeter to about 2810 gram-force per 25 millimeter as determined at a temperature of 25° C. and a tensile rate of 300 millimeters per minute.

12. The adhesive member of claim 5, wherein the at least one (meth)acrylate monomer is present in an amount of about 80 weight percent or greater based on the total weight of the resin composition.

13. A display device comprising:

a display panel;

a window disposed on the display panel; and an adhesive member of claim 5 disposed between the display panel and the window, wherein the display device comprises at least one folding region, wherein the folding region has a radius of curvature of about 5 millimeter or less.

14. The display device of claim 13, wherein the thickness of the adhesive member is about 50 micrometer to 200 micrometer.

15. The display device of claim 13, further comprising an input sensing unit disposed on the display panel, wherein the adhesive member is disposed between the display panel and the input sensing unit or between the input sensing unit and the window.

16. The display device of claim 15, wherein the display panel comprises a display element layer and an encapsulation layer disposed on the display element layer, wherein the input sensing unit is directly disposed on the encapsulation layer, and the adhesive member is disposed on the input sensing unit.

17. The display device of claim 13, wherein the adhesive member is formed by directly providing the resin composition on a surface of the window or on a surface of the display panel, and ultraviolet light-curing the provided resin composition.

18. The display device of claim 13, further comprising:

a light control layer disposed between the adhesive member and the window, and an optical adhesive layer disposed between the light control layer and the window, wherein the optical adhesive layer comprises a polymer derived from the resin composition.

19. The display device of claim 13, wherein the monomer having a 2-pyrrolidone skeleton and a radical curable group is present in the resin composition in an amount of 0.1 weight percent to 3.5 weight percent.

20. The display device of claim 13, wherein the monofunctional (meth)acrylate having an imide ring structure is present in the resin composition in an amount of 0.1 weight percent to 3.5 weight percent.

* * * * *